US012760846B2

(12) United States Patent
Pandey et al.

(10) Patent No.: US 12,760,846 B2
(45) Date of Patent: Oct. 13, 2026

(54) HYDROGEN SAFETY SYSTEM

(71) Applicant: HONEYWELL INTERNATIONAL INC., Charlotte, NC (US)

(72) Inventors: Amit Pandey, Kanpur (IN); Hemalatha Narayanaswamy, Charlotte, NC (US); Sandeep Wankhede, Pune (IN); Darrius Kilpatrick, Saint Augustine, FL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 274 days.

(21) Appl. No.: 18/525,912

(22) Filed: Dec. 1, 2023

(65) Prior Publication Data

US 2025/0180170 A1 Jun. 5, 2025

(51) Int. Cl.
*F17C 13/12* (2006.01)
*F17C 13/02* (2006.01)

(52) U.S. Cl.
CPC ............ *F17C 13/12* (2013.01); *F17C 13/025* (2013.01); *F17C 13/026* (2013.01); *F17C 2221/012* (2013.01); *F17C 2250/034* (2013.01); *F17C 2250/036* (2013.01); *F17C 2250/043* (2013.01); *F17C 2250/0439* (2013.01); *F17C 2250/0452* (2013.01); *F17C 2250/046* (2013.01); *F17C 2250/0636* (2013.01); *F17C 2250/0694* (2013.01); *F17C 2260/044* (2013.01)

(58) Field of Classification Search
None
See application file for complete search history.

(56) References Cited

U.S. PATENT DOCUMENTS

| | | | | |
|---|---|---|---|---|
| 2012/0318048 | A1* | 12/2012 | Patel | G01M 3/20 73/40.7 |
| 2018/0094775 | A1* | 4/2018 | Jacobson | F17D 5/005 |
| 2021/0047971 | A1* | 2/2021 | Turner | F02D 41/0027 |
| 2021/0216852 | A1* | 7/2021 | Reece | G06N 3/08 |
| 2021/0344025 | A1* | 11/2021 | Morinaga | H01M 8/2475 |

(Continued)

OTHER PUBLICATIONS

Suzuki et al., Machine learning model for detecting hydrogen leakage from hydrogen pipeline using physical modeling, Sep. 11-14, 2023, 4th Asia Pacific Conference of the Prognostics and Health Management, Tokyo, Japan, p. 1-6. (Year: 2023).*

*Primary Examiner* — Kidest Worku
(74) *Attorney, Agent, or Firm* — Alston & Bird LLP

(57) ABSTRACT

Approaches for predicting or detecting hydrogen leakage in a hydrogen amenity, are described. According to one example, a hydrogen leakage detection unit may be provided. The hydrogen leakage detection unit may receive sensor data for a section of hydrogen amenity from a sensor unit installed proximate to the section. The sensor data may include at least one of a concentration level of hydrogen within the section, a concentration level of metal particles in the hydrogen, a temperature value of the hydrogen, a pressure value of the hydrogen, a humidity value around the section, a deviation level of electrochemical liquid within the sensor unit, and an image of the section. The sensor data may be processed to ascertain occurrence of existing hydrogen leakage or probable hydrogen leakage at the section. One or more preventive actions may be initiated upon ascertaining the occurrence of existing hydrogen leakage or probable hydrogen leakage.

13 Claims, 10 Drawing Sheets

(56) References Cited

U.S. PATENT DOCUMENTS

| | | | | |
|---|---|---|---|---|
| 2022/0307652 A1* | 9/2022 | Ewan | F17C 11/005 |
| 2022/0373134 A1* | 11/2022 | Sinding | F17C 5/06 |
| 2022/0388620 A1* | 12/2022 | Kimura | B63H 21/17 |
| 2023/0313953 A1* | 10/2023 | Shi | G01M 3/22<br>73/40.5 R |
| 2023/0332976 A1* | 10/2023 | Chen | F17D 5/02 |

* cited by examiner

HYDROGEN SAFETY SYSTEM

BACKGROUND

Hydrogen is widely used in industry for various purposes. For example, hydrogen may be used as a feedstock in oil refining, ammonia production, methanol production, and steel making. Hydrogen may also be used as an energy carrier and a storage medium for power generation and grid balancing. Liquified hydrogen may be used as a transportation fuel in different industries, such as in automotives, aviation, and marine.

Storage or transportation of large quantities of hydrogen, however, involves a high risk of occurrence of disastrous incidents, such as explosion and fire due to the highly flammable nature of hydrogen. Thus, hydrogen amenities, such as storage tanks and pipes used for storage and transportation of hydrogen are specially designed to prevent such incidents. However, any leakages of hydrogen from the hydrogen amenities may expose the hydrogen to air, thereby, causing the disastrous incidents. In order to prevent such incidents, the hydrogen amenities are typically equipped with safety systems for detecting hydrogen leakage and taking remedial actions upon detecting any such leakage.

BRIEF DESCRIPTION OF FIGURES

Systems and/or methods are now described, in accordance with examples of the present subject matter and with reference to the accompanying figures, in which.

DETAILED DESCRIPTION

Figure 1:
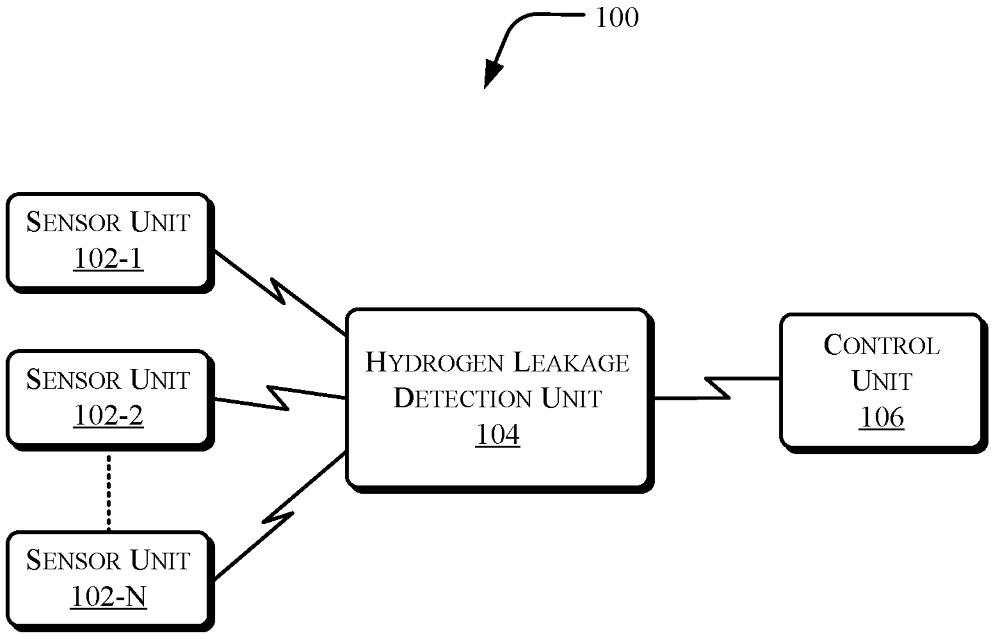
FIG. 1 illustrates a block diagram of a system for detecting hydrogen leakage in a hydrogen amenity, according to an example.

With advancement in technology, hydrogen safety systems have been developed for detecting hydrogen leakage in hydrogen amenities, such as tanks and pipes used for storage and transportation of hydrogen. Such hydrogen safety systems may also assist in taking remedial actions upon detecting any such leakage.

However, the hydrogen safety systems currently deployed for hydrogen detection are slow and inefficient. One such hydrogen safety system involves use of hydrogen detectors for detecting hydrogen gas leakage. Such hydrogen detectors are placed around the hydrogen amenities for detecting hydrogen gas. However, as hydrogen is colorless and odourless, substantial delay may occur in hydrogen leakage detection. Further, since hydrogen is very light, the diffusion rate of hydrogen gas is faster than those of other gases. For example, by volume, hydrogen diffuses or leaks at around 3 times the diffusion rate of natural gas. Therefore, by the time the currently deployed hydrogen safety systems detect hydrogen leakage, some damage may have already happened. Further, the currently deployed hydrogen safety systems fail to accurately determine the location of the hydrogen leakage.

In addition, the currently deployed safety systems typically detect hydrogen leakage at a stage where the hydrogen leakage has already occurred and thus some damage has already been caused or is soon bound to happen. Thus, any delay in detecting hydrogen leakage and its location may substantially increase the severity of the damage caused to the hydrogen amenity and may also increase the cost involved in taking any remedial actions or repairing of the hydrogen amenities. As a result, currently deployed hydrogen safety systems fail to avoid damages and the cost involved in taking remedial actions and repairing of the hydrogen amenities.

Approaches for predicting or detecting hydrogen leakage in a hydrogen amenity, are described. The hydrogen amenity may be a hydrogen storage facility or a hydrogen transportation line. Examples of the hydrogen amenity may include, but are not limited to, metal tanks and metal pipes.

The present subject matter uses sensor data, associated with a section of the hydrogen amenity, to predict or detect hydrogen leakage at the section. In one example, the sensor data includes at least one of a concentration level of hydrogen within the section, a concentration level of metal particles in the hydrogen, a temperature value of the hydrogen, a pressure value of the hydrogen, a humidity value around the section, a deviation level of an electrochemical liquid within a sensor unit, and an image of the section of the hydrogen amenity. The sensor data may be processed to ascertain one of an existing hydrogen leakage and a probable hydrogen leakage, at the corresponding section of the hydrogen amenity. The existing hydrogen leakage may indicate that hydrogen leakage from the hydrogen amenity has already begun. The probable hydrogen leakage may indicate that currently there is no leakage in the hydrogen amenity, but hydrogen is likely to leak in future if no preventive action is taken. Upon detecting either the existing hydrogen leakage or the probable hydrogen leakage, a preventive action may be initiated to repair and prevent any damage due to the hydrogen leakage.

The described approaches thus provide a simple and robust analytical methodology for early and quick prediction and detection of hydrogen leakage in the hydrogen amenity. As a result, occurrence of any damage or accident due to hydrogen leakage from the hydrogen amenity can be prevented, and the cost required for repairing the hydrogen amenity and for initiating preventive actions may be reduced.

According to an example implementation of the present subject matter, the sensor data may be received from each of one or more sensor units installed proximate to a hydrogen amenity. In one example, each of the one or more sensor units may be installed proximate to a corresponding section of the hydrogen amenity. Each of the one or more sensor units may sense and generate the sensor data for the corresponding section of the hydrogen amenity. The sensor data, for each of the one or more sensor units, may be subsequently processed to ascertain occurrence of a hydrogen leakage event at the corresponding section of the hydrogen amenity. The hydrogen leakage event may be one of the existing hydrogen leakage and the probable hydrogen leakage. In one example, the sensor data may be analyzed using a pre-trained leakage detection model developed based on statistical analysis of historical variations in the sensor data associated with the hydrogen leakage event. One or more preventive actions may then be initiated upon ascertaining occurrence of the hydrogen leakage event at a particular section of the hydrogen amenity.

In case the existing hydrogen leakage is detected, the preventive action may include immediate discontinuation of the supply of hydrogen to the section of the hydrogen amenity where hydrogen leakage has been detected. In addition or as an alternate a service technician may be selected for visiting the hydrogen amenity to repair the section of the hydrogen amenity where the hydrogen leakage has been detected. The supply of hydrogen to the section of the hydrogen amenity may be discontinued by transmitting a discontinuation signal to a control unit configured to operate one or more valves installed at the hydrogen amenity for controlling supply of hydrogen to the hydrogen amenity. In one example, the service technician may be selected based on at least one of a service rating of the corresponding service technician and a distance of the corresponding service technician from the corresponding section of the hydrogen amenity.

Further, upon detecting the existing hydrogen leakage, a hydrogen leakage amount may be also determined. The hydrogen leakage amount may indicate the amount of hydrogen that has already leaked from the hydrogen amenity. The system may also generate a site visit recommendation based on a comparison of the hydrogen leakage amount and a safe hydrogen level threshold. In an example, the site visit recommendation may indicate whether it is safe for the service technician to visit the hydrogen amenity immediately. In another example, the site visit recommendation may indicate a time until or after which it may not be safe for the service technician to visit the hydrogen amenity. An alert notification may accordingly be transmitted to a user device of the service technician to initiate repair work at the hydrogen amenity. In an example, the alert notification may include identification data for the hydrogen amenity and/or the section of the hydrogen amenity where the hydrogen leakage has been detected. In an example, the alert notification may include at least one of an indication of the existing hydrogen leakage, the hydrogen leakage amount, and the site visit recommendation.

In case the probable hydrogen leakage is detected, the preventive action may include at least on of scheduling a downtime for the hydrogen amenity to enable repair of the hydrogen amenity, discontinuing the supply of hydrogen to the section of the hydrogen amenity during the downtime, and selecting a service technician for visiting the hydrogen amenity to repair the section of the hydrogen amenity where hydrogen leakage has been predicted. Further, an estimated leakage time for the probable occurrence of hydrogen leakage may be determined.

The estimated leakage time may indicate the time within which the hydrogen leakage is expected to start. In one example, the downtime may be scheduled in accordance to the estimated leakage time. During the downtime, the supply of hydrogen may be discontinued to the section of the hydrogen amenity by generating and transmitting a downtime schedule, indicating a scheduled downtime, to a control unit configured to operate one or more valves installed at the hydrogen amenity for controlling supply of hydrogen to the hydrogen amenity. An alert notification may accordingly be transmitted to a user device of the service technician to initiate repair work at the hydrogen amenity. In an example, the alert notification may include identification data for the hydrogen amenity and/or the section of the hydrogen amenity where the hydrogen leakage has been detected. In an example, the alert notification may include at least one of an indication of the probable hydrogen leakage, the estimated leakage time, and the downtime for the hydrogen amenity.

The present invention thus allows early detection of the existing hydrogen leakage and early prediction of the probable hydrogen leakage. Use of the sensor data and/or the pre-trained leakage detection model may facilitate in early detection of the existing hydrogen leakage and early prediction of the probable hydrogen leakage. Further, the pre-trained leakage detection model enables accurate detection of the existing hydrogen leakage and accurate prediction of the probable hydrogen leakage at a section of the hydrogen amenity. Therefore, the present invention prevents occurrence of any damage or accident due to hydrogen leakage from the hydrogen amenity. Further, due to the early detection of the existing hydrogen leakage and early prediction of the probable hydrogen leakage, the present invention reduces the cost required for repairing the hydrogen amenity and for initiating preventive actions to prevent any damage or accident.

Further, the existing hydrogen leakage or the probable hydrogen leakage is ascertained for a corresponding section of the hydrogen amenity. Thus, identification data for at least one of the hydrogen amenity and the section of the hydrogen amenity may be transmitted to a service technician. The identification data helps the service technician to accurately identify the location of the hydrogen leakage and enable the service technician to quickly repair the hydrogen amenity. The present invention thus accurately identifies the location of the hydrogen leakage and enables the service technician to quickly repair the hydrogen amenity.

The present subject matter is further described with reference to FIG. 1 to FIG. 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a system 100 for detecting hydrogen leakage in a hydrogen amenity, according to an example. In one example, the system 100 may be a distributed computing system having one or more physical computing systems geographically distributed at same or different locations. In another example, one or more components of the system 100 may be hosted virtually, for example, on a cloud-based platform. In yet another example, the system 100 may be a stand-alone system and may be co-located with the hydrogen amenity inside a premises housing the hydrogen amenity. In yet another example, the hydrogen amenity and some components of the system 100 may be located at different locations. Examples of the premises may include, but are not limited to, a power station, a hydrogen production plant, an ammonia production plant, a methanol production plant, a hydrogen fuel station, a steel mill, a building, an area belonging to the building, any covered or uncovered area including a hydrogen storage facility or a hydrogen transportation line, and a perimeter of interest around the building or the covered or uncovered area. The building may be a commercial or a residential establishment, for example, a residential apartment, a hotel, an inn, a motel, a resort, an educational institute, a commercial complex, an industrial establishment, a data center, a storage facility, and a hospital. Further, a building may also refer to a combination of two or more structures or compounds. In an example, the building may include a heating system utilizing hydrogen for heating at least some part of the building. The hydrogen amenity may be a structure or a combination of two or more structures used to store or transport hydrogen. Thus, the hydrogen amenity may include a hydrogen storage facility or a hydrogen transportation line. Examples of the hydrogen amenity may include, but are not limited to, tanks and pipes. In an example, the hydrogen amenity may be manufactured using one or more metallic material.

The system 100 may include one or more sensor units 102-1 to 102-N, a hydrogen leakage detection unit 104, and a control unit 106. The one or more sensor units 102-1 to 102-N may be individually referred to as a sensor unit 102 and collectively referred to as sensor units 102. The sensor unit 102 and the hydrogen leakage detection unit 104 may be communicably coupled with each other. Further, the hydrogen leakage detection unit 104 and the control unit 106 may be communicably coupled with each other.

In one example, the sensor units 102 may be co-located with the hydrogen amenity within the premises. Each of the sensor units 102 may be installed proximate to a corresponding section of the hydrogen amenity. Examples of the sensor units 102 may include, but are not limited to, a sensor to measure a concentration level of hydrogen within the hydrogen amenity, a sensor to measure a concentration level of metal particles in the hydrogen, a temperature sensor to measure a temperature value of the hydrogen, a pressure sensor to measure a pressure value of the hydrogen, a humidity sensor to measure a humidity value around the section, an electrochemical sensor to measure a deviation level of an electrochemical liquid within the sensor unit 102, and an image capturing device to capture an image of the hydrogen amenity.

In one example, the hydrogen leakage detection unit 104 may be hosted virtually, for example, on a cloud-based platform at the premises including the hydrogen amenity or away from the premises. In another example, the hydrogen leakage detection unit 104 may be a stand-alone physical system geographically located either on the premises or away from the premises.

In one example, the control unit 106 may be hosted virtually, for example, on a cloud-based platform at the premises including the hydrogen amenity or away from the premises. In another example, the control unit 106 may be a stand-alone physical system geographically located either on the premises or away from the premises. The control unit 106 may be configured to control supply of hydrogen to the hydrogen amenity. In one example, the control unit 106 may be communicably coupled to one or more valves installed at the hydrogen amenity. The control unit 106 may be configured to operate the valves to control the supply of hydrogen to the hydrogen amenity.

In operation, each of the sensor units 102 may be configured to sense, for a section of the hydrogen amenity, at least one of a concentration level of hydrogen within the section, a concentration level of metal particles in the hydrogen, a temperature value of the hydrogen, a pressure value of the hydrogen, a humidity value around the section, a deviation level of an electrochemical liquid within the sensor unit 102, and an image of the section of the hydrogen amenity. Further, each of the sensor units 102 may be configured to generate sensor data for the section of the hydrogen amenity, where the sensor data includes at least one of the concentration level of the hydrogen, the concentration level of the metal particles in the hydrogen, the temperature value of the hydrogen, the pressure value of the hydrogen, the humidity value around the section, the deviation level of the electrochemical liquid within the sensor unit 102, and the image of the section of the hydrogen amenity. Each of the sensor units 102 may transmit the sensor data to the hydrogen leakage detection unit 104.

The hydrogen leakage detection unit 104 may receive, from each of the sensor units 102, the sensor data for the corresponding section of the hydrogen amenity. Subsequently, the hydrogen leakage detection unit 104 may process, for each of the sensor units 102, the corresponding sensor data to ascertain occurrence of a hydrogen leakage event at the corresponding section of the hydrogen amenity. The hydrogen leakage event may include at least one of an existing hydrogen leakage and a probable hydrogen leakage. The existing hydrogen leakage may indicate that hydrogen leakage from the hydrogen amenity has already begun. The probable hydrogen leakage may indicate that currently there is no leakage in the hydrogen amenity, but hydrogen is likely to leak in future if no preventive action is taken.

Further, the hydrogen leakage detection unit 104 may initiate one or more preventive actions upon ascertaining occurrence of the hydrogen leakage event at a section of the hydrogen amenity. Examples of the preventive actions may include, but are not limited to, communicating with the control unit 106 for shutting off supply of hydrogen to the section of the hydrogen amenity at which the hydrogen leakage event is ascertained, scheduling a downtime for the hydrogen amenity to enable repair of the hydrogen amenity, selecting a service technician to visit the hydrogen amenity for repairing the hydrogen amenity, and notifying the service technician about the hydrogen leakage event.

The control unit 104 may communicate with the hydrogen leakage detection unit 104 and subsequently control the supply of hydrogen to the hydrogen amenity based on the communication.

Figure 2A:
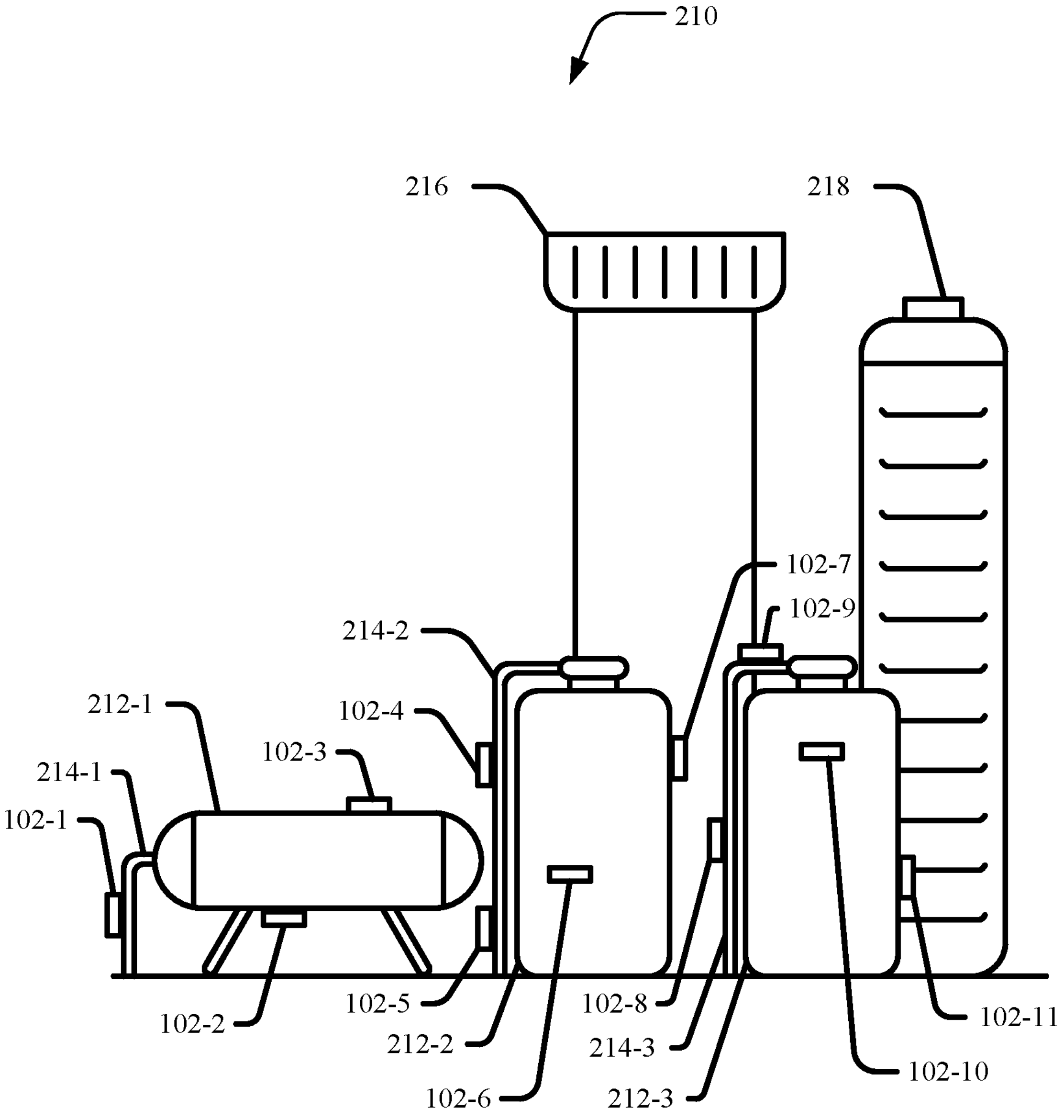
FIG. 2A illustrates an example hydrogen production plant including exemplary hydrogen amenities equipped with one or more sensor units of a system for detecting hydrogen leakage, according to an example.

FIG. 2A illustrates an example hydrogen production plant 210 including exemplary hydrogen amenities equipped with the sensor units 102, according to an example. As exemplarily illustrated in FIG. 2A, the example hydrogen production plant 210 may include hydrogen storage facilities 212-1, 212-2, and 212-3, hydrogen transportation lines 214-1, 214-2, and 214-3, the sensor units 102-1 to 102-11, a chimney 216, and a steam reformer 218. The sensor units 102-1, 102-2, 102-3, 102-4, 102-5, 102-6, 102-7, 102-8, 102-9, 102-10, and 102-11 may be individually referred to as sensor unit 102 and collectively referred to as sensor units 102. The hydrogen storage facilities 212-1, 212-2, and 212-3 may be individually referred to as hydrogen storage facility 212 and collectively referred to as hydrogen storage facilities 212. The hydrogen transportation lines 214-1, 214-2, and 214-3 may be individually referred to as hydrogen transportation line 214 and collectively referred to as hydrogen transportation lines 214. In an example, the hydrogen storage facility 212 may be high-pressure tanks, such as high-pressure metal tanks. In an example, the hydrogen transportation line 214 may be metal pipes. In another example, the hydrogen storage facility 212 and the hydrogen transportation line 214 may be manufactured using other known hydrogen safe material.

In an example, the sensor units 102 may be installed around the hydrogen storage facility 212 or the hydrogen transportation line 214 in a way such that the sensor units 102 may collectively detect or predict hydrogen leakage for any part of the entire hydrogen storage facility 212 or the entire hydrogen transportation line 214. As illustrated, the sensor unit 102-1 may be installed proximate to a section of the hydrogen transportation line 214-1, whereas the sensor units 102-2 and 102-3 maybe installed proximate to a corresponding section of the hydrogen storage facility 212-1. Further, the sensor units 102-4 and 102-5 may be installed proximate to a corresponding section of the hydrogen transportation line 214-2, while the sensor units 102-6 and 102-7 may be installed proximate to a corresponding section of the hydrogen storage facility 212-2. The sensor units 102-8 and 102-9 may be installed proximate to a corresponding section of the hydrogen transportation line 214-4, while the sensor units 102-10 and 102-11 may be installed proximate to a corresponding section of the hydrogen storage facility 212-3.

Although a maximum of three sensor units 102 have been illustrated proximate to each hydrogen amenity, such as the hydrogen storage facility 212 or the hydrogen transportation line 214, for the sake of brevity, it should be understood to a person skilled in the art that any number of the sensor units 102 can be installed proximate to each hydrogen amenity. In an example, the number of the sensor units 102 that may be installed proximate to each hydrogen amenity may be determined based on sensing capabilities of the sensor unit 102 and dimensions, such as length, breadth, and an outer surface area of the hydrogen amenity. For example, if the outer surface area of a first hydrogen amenity is greater than the outer surface area of a second hydrogen amenity, then greater number of the sensor units 102 may be installed proximate to the second hydrogen amenity as compared to the first hydrogen amenity. In an example, the sensing capabilities of the sensor unit 102 may include range of the sensor unit 102, i.e., the outer surface area of the hydrogen amenity for which the sensor unit 102 may sense and generate the sensor data.

In operation, the steam reformer 218 may be configured to receive natural gas and carry out reactions of the natural gas with steam to produce hydrogen along with carbon dioxide as a byproduct. The chimney 216 may be used for venting the carbon dioxide, produced as the byproduct, to the external atmosphere. The hydrogen produced by the steam reformer 218 may be transported through the hydrogen transportation lines 214 to the hydrogen storage facilities 212 for storage. The sensor units 102 may be configured to sense and generate the sensor data for the corresponding sections of the hydrogen amenities. The sensor units 102 may transmit the sensor data to the hydrogen leakage detection unit 104 for detection of the existing hydrogen leakage or prediction of the probable hydrogen leakage.

Figure 2B:
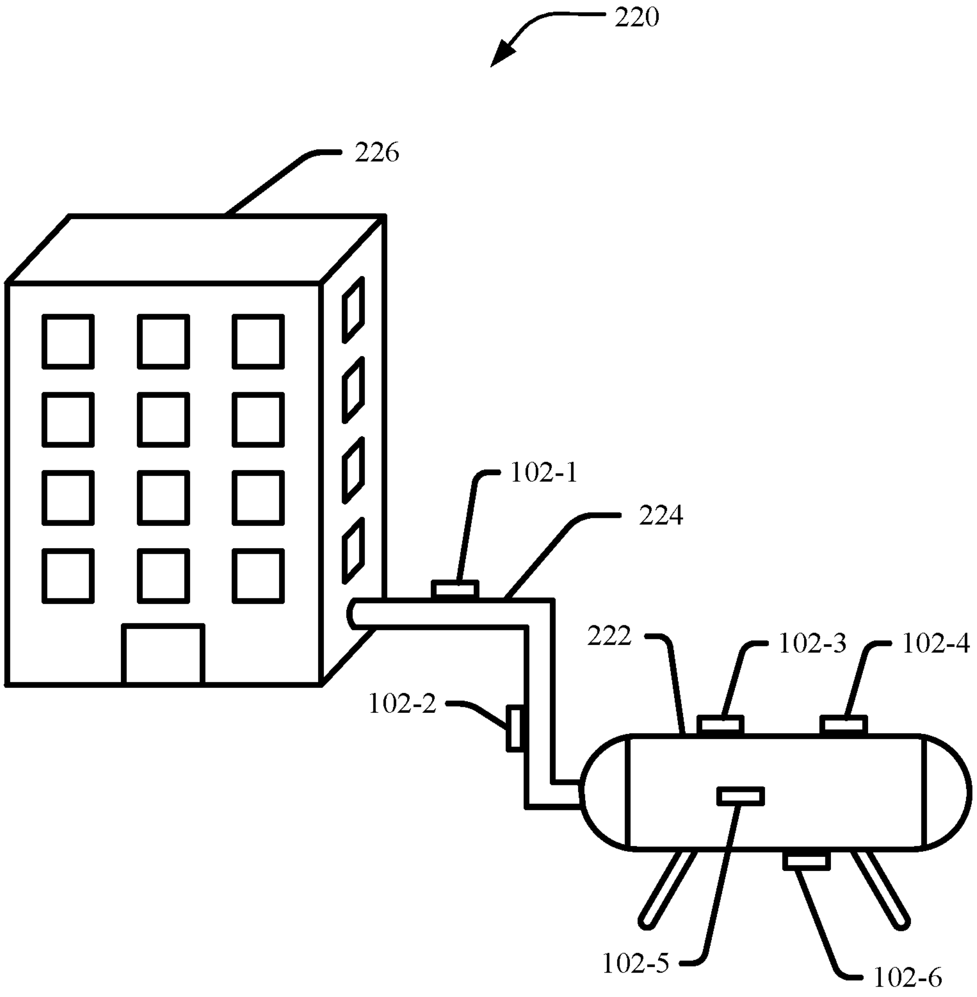
FIG. 2B illustrates an example establishment including exemplary hydrogen amenities equipped with one or more sensor units of a system for detecting hydrogen leakage, according to another example.

FIG. 2B illustrates an example establishment 220 including exemplary hydrogen amenities equipped with the sensor units 102, according to an example. As exemplarily illustrated in FIG. 2B, the example establishment 220 may include hydrogen storage facility 222, hydrogen transportation line 224, the sensor units 102-1 to 102-6, and a building 226. In an example, the hydrogen storage facility 222 may be a high-pressure tank, such as a high-pressure metal tank. In an example, the hydrogen transportation line 224 may be a metal pipe. The hydrogen transportation line 224 may connect the hydrogen storage facility 222 to a heating system (not illustrated) deployed inside the building 226. The heating system may utilize hydrogen stored in the hydrogen storage facility 222 for maintaining the temperature at a predetermined level within the building 226. The building 226 may be a commercial or a residential establishment, for example, a residential apartment, a hotel, an inn, a motel, a resort, an educational institute, a commercial complex, an industrial establishment, a data center, a storage facility, and a hospital.

In an example, the sensor units 102 may be installed around the hydrogen storage facility 222 or the hydrogen transportation line 224 in a way such that the sensor units 102 may collectively detect or predict hydrogen leakage for any part of the entire hydrogen storage facility 222 or the entire hydrogen transportation line 224. As illustrated, each of the sensor units 102-1 and 102-2 may be installed proximate to a corresponding section of the hydrogen transportation line 224, while the sensor units 102-3, 102-4, 102-5, and 102-6 may be installed proximate to a corresponding section of the hydrogen storage facility 222. The sensor units 102 may be configured to sense and generate the sensor data for the corresponding sections of the hydrogen amenities. The sensor units 102 may transmit the sensor data to the hydrogen leakage detection unit 104 for detection of the existing hydrogen leakage or prediction of the probable hydrogen leakage.

Although a maximum of five sensor units 102 have been illustrated proximate to each hydrogen amenity, such as the hydrogen storage facility 222 or the hydrogen transportation line 224, for the sake of brevity, it should be understood to a person skilled in the art that any number of the sensor units 102 can be installed proximate to each hydrogen amenity. In an example, the number of the sensor units 102 that may be installed proximate to each hydrogen amenity may be determined based on sensing capabilities of the sensor unit 102 and dimensions, such as length, breadth, and the outer surface area of the hydrogen amenity.

Figure 3A:
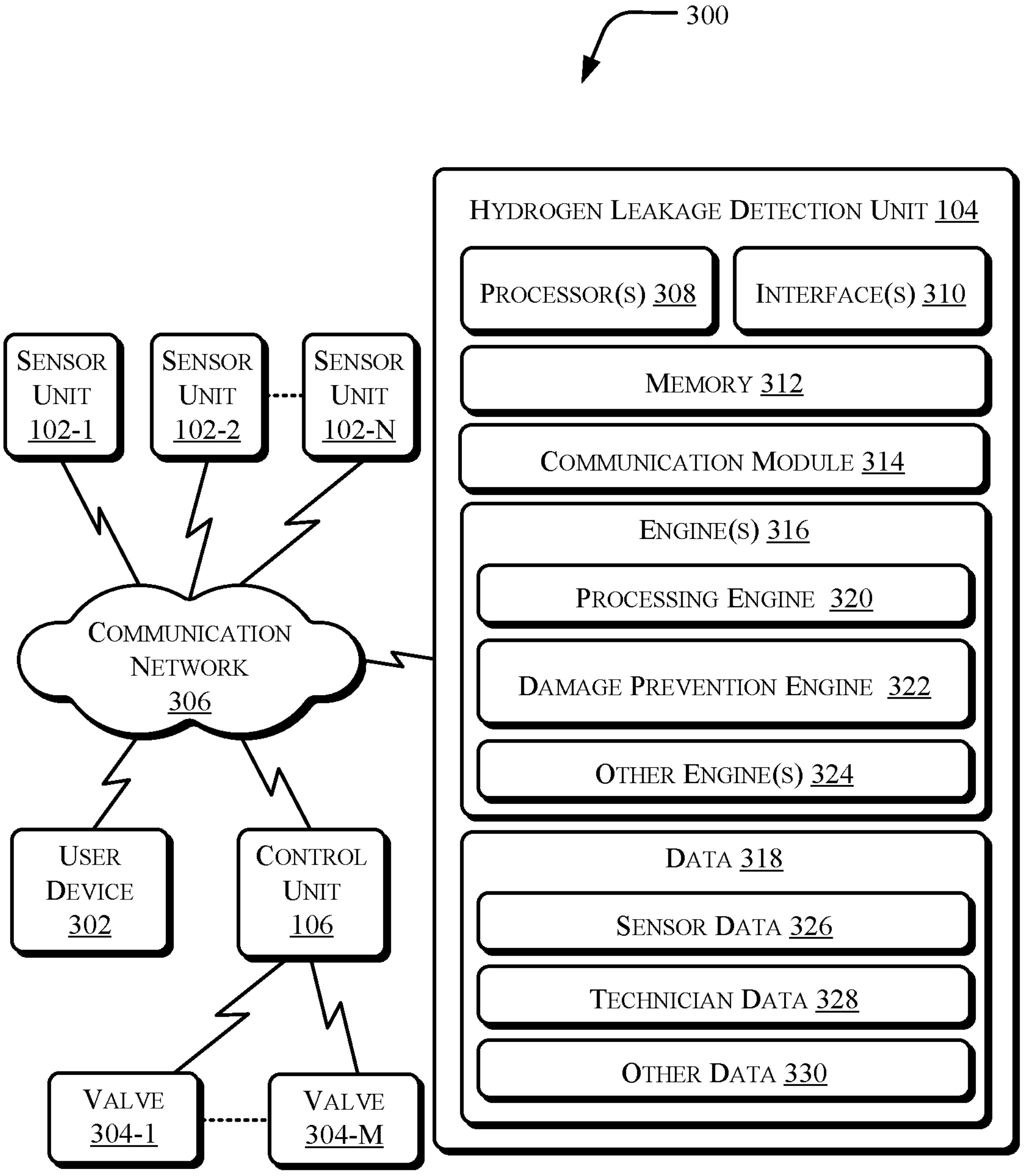
FIG. 3A and FIG. 3B illustrate a computing environment implementing a system for detecting hydrogen leakage, according to an example.
Figure 3B:
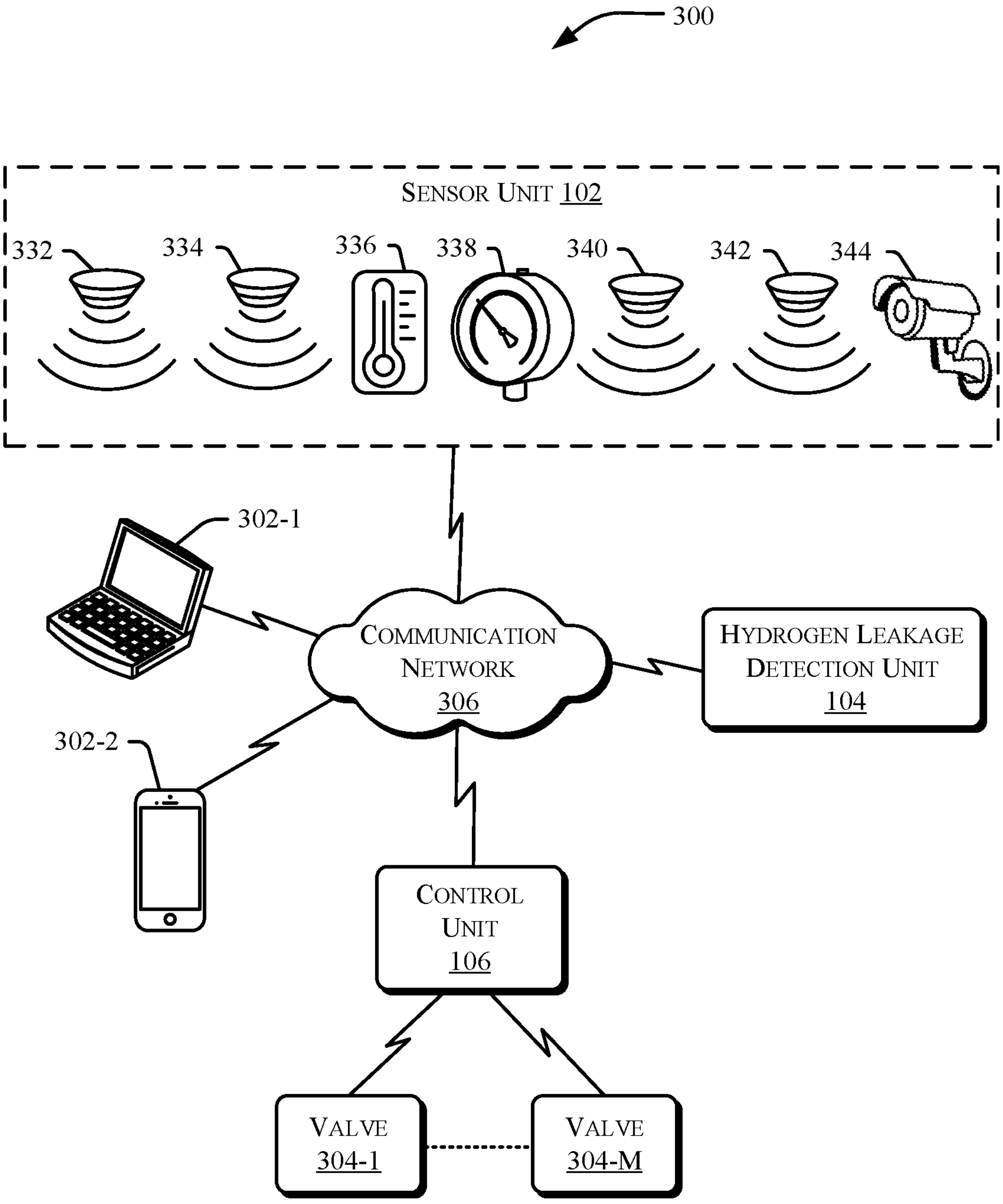

FIG. 3A and FIG. 3B illustrate a computing environment 300 implementing the system 100, according to an example. In one example, the computing environment 300 may include the sensor units 102, the hydrogen leakage detection unit 104, the control device 106, a user device 302, and one or more valves 304-1 to 304-M, where M is a natural number. The one or more valves 304-1 to 304-M may be individually referred to as valve 304 and collectively referred to as valves 304. The sensor unit 102, the control unit 106, and the user device 302 may be communicably coupled with the hydrogen leakage detection unit 104 over a communication network 306.

The communication network 306 may be a wireless network, a wired network, or a combination thereof. The communication network 306 may also be an individual network or a collection of many such individual networks, interconnected with each other and functioning as a single large network, e.g., the Internet or an intranet. Examples of such individual networks include local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN).

Depending on the technology, the communication network 306 may include various network entities, such as transceivers, gateways, and routers. In an example, the communication network 306 may include any communication network that uses any of the commonly used protocols, for example, Hypertext Transfer Protocol (HTTP), and Transmission Control Protocol/Internet Protocol (TCP/IP).

The sensor unit 102, the control unit 106, the hydrogen leakage detection unit 104, and the user device 302 may thus be communicably coupled with each other over the communication network 306 and may exchange data and signals. Similarly, the valves 304 and the control unit 106 may be communicably coupled with each other and may exchange data and signals. Although the valves 304 have been illustrated to have a direct connection with the control unit 106, in an example, the valves 304 may be communicably coupled with the control unit 106 over the communication network 306.

In one example, the hydrogen leakage detection unit 104 may include processor(s) 308, interface(s) 310, memory 312, a communication module 314, engine(s) 316, and data 318. The hydrogen leakage detection unit 104 may include components, other than the depicted components, such as display, input/output interfaces, operating systems, applications, and other software or hardware components (all of which have not been depicted).

The processor(s) 308 may be implemented as microprocessors, microcomputers, microcontrollers, digital signal processors, central processing units, state machines, logic circuitries, and/or other devices that manipulate signals based on operational instructions. The interface(s) 310 may allow the connection or coupling of the hydrogen leakage detection unit 104 with one or more other devices, such as the sensor unit 102, the control unit 106, and the user device 122, through a wired (e.g., Local Area Network, i.e., LAN) connection or through a wireless connection (e.g., Bluetooth®, Wi-Fi). The interface(s) 310 may also enable intercommunication between different logical as well as hardware components of the hydrogen leakage detection unit 104.

The memory 312 may be a computer-readable medium, examples of which include volatile memory (e.g., RAM), and/or non-volatile memory (e.g., Erasable Programmable read-only memory, i.e., EPROM, flash memory, etc.). The memory 312 may be an external memory, or internal memory, such as a flash drive, a compact disk drive, an external hard disk drive, or the like. The memory 312 may further include data 318 and/or other data which either may be received, utilized, or generated during the operation of the hydrogen leakage detection unit 104.

The communication module 314 may be a wireless communication module. Examples of the communication module 314 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication module 314 may also include one or more antennas to enable wireless transmission and reception of data and signals.

The engine(s) 316 may be implemented as a combination of hardware and programming, for example, programmable instructions to implement a variety of functionalities of the engine(s) 316. In examples described herein, such combinations of hardware and programming may be implemented in several different ways. For example, the programming for the engine(s) 316 may be executable instructions. Such instructions may be stored on a non-transitory machine-readable storage medium which may be coupled either directly with the hydrogen leakage detection unit 104 or indirectly (for example, through networked means). In an example, the engine(s) 316 may include a processing resource, for example, either a single processor or a combination of multiple processors, to execute such instructions. In the present examples, the non-transitory machine-readable storage medium may store instructions that, when executed by the processing resource, implement engine(s) 316. In other examples, the engine(s) 316 may be implemented as electronic circuitry.

In one example, the engine(s) 316 may include a processing engine 320, a damage prevention engine 322, and other engine(s) 324. The other engine(s) 324 may further implement functionalities that supplement functions performed by the hydrogen leakage detection unit 104 or any of the engine(s) 316.

The data 318 includes data that is either received, stored, or generated as a result of functions implemented by any of the engine(s) 316 or the hydrogen leakage detection unit 104. It may be further noted that information stored and available in the data 318 may be utilized by the engine(s) 316 for performing various functions by the hydrogen leakage detection unit 104. The data 318 may include sensor data 326, technician data 328, and other data 330. The sensor data 326 may be data that is received from the sensor units 102. The technician data may include details such as name, user device 302, location, a service rating, etc., associated to each of a plurality of service technicians. In an example, the technician data may be maintained at the hydrogen leakage detection unit 104. In another example, the technician data may be maintained at an external database (not illustrated) and the hydrogen leakage detection unit 104 may obtain the technician data from the external database. The other data 330 includes data that is either received, stored, or generated as a result of functions implemented by any of the engine(s) 316 or the hydrogen leakage detection unit 104.

As exemplarily illustrated in FIG. 3B, the sensor units 102 may include at least one of a first sensor 332, a second sensor 334, a temperature sensor 336, a pressure sensor 338, a humidity sensor 340, an electrochemical sensor 342, and an image capturing device 344. The first sensor 332 may be configured to measure a concentration level of hydrogen within a hydrogen amenity, such as a hydrogen storage facility or a hydrogen transportation line. The second sensor 334 may be configured to measure a concentration level of metal particles in the hydrogen. Examples of the second sensor 334 may include, but are not limited to, an infrared sensor, an ultrasonic sensor, and a light detection and ranging (LIDAR) sensor. In an example, the first sensor 332 and the second sensor 334 may be non-invasive sensors. The temperature sensor 336 may be configured to measure a temperature value of the hydrogen. The pressure sensor 338 may be configured to measure a pressure value of the hydrogen. The humidity sensor 340 may be configured to measure a humidity value around the hydrogen amenity. The electrochemical sensor 342 may be configured to measure a deviation level of an electrochemical liquid within the sensor unit 102. In an example, the deviation level may be indicative of changes within a chemical composition of the electrochemical liquid of the sensor unit 102. In an example, the electrochemical sensor 342 may be configured to sense hydrogen around the hydrogen amenity and electrochemical behavior changes within the sensor unit 102. The image capturing device 344 may be configured to capture an image of the hydrogen amenity. In one example, the image may be an image of a corresponding section of the hydrogen amenity proximate to which the image capturing device 344 has been installed. Examples of the image capturing device 344 may include, but are not limited to, a digital camera, a video recorder, a surveillance camera, and a thermal imaging camera.

Examples of the user devices 302-1 and 302-2, hereinafter collectively referred to as user device 302 and individually referred to as user device 302, may include, but are not limited to, a mobile phone, a laptop, a tablet, and a personal digital assistant (PDA). In one example, the user devices 302 may be associated with a service technician from among a plurality of service technicians. Although two user devices 302 have been illustrated in FIG. 3B for the sake of brevity, it should be understood to a person skilled in the art that any number of user devices 302 may be connected with the hydrogen leakage detection unit 104.

In operation, the processing engine 320 may determine a corresponding section of the hydrogen amenity for installing the sensor unit 102 based on at least one of an aperture of the sensor unit, a material of the hydrogen amenity, and a material of the sensor unit. In an example, the hydrogen amenity may be manufactured using a chemochromic pigment for early detection or prediction of the hydrogen leakage in the hydrogen amenity. In an example, the sensor unit 102 may be manufactured using a chemochromic pigment for early detection or prediction of the hydrogen leakage in the hydrogen amenity. In an example, the aperture of the sensor unit 102 may indicative of a dimension, such as the length or the surface area of the hydrogen amenity for which the sensor unit 102 may sense and generate the sensor data. Thus, the aperture of the sensor unit 102 may also define the part of the hydrogen amenity for which the sensor unit 102 may effectively sense and generate the sensor data. Thus, the sensor units 102 may be installed proximate to a corresponding section of the hydrogen amenity which is determined by the processing engine 320, such that the entirety or a required part of the hydrogen amenity is monitored using the sensor units 102.

In one example, the sensor unit 102 may be configured to sense, for a corresponding section of the hydrogen amenity, at least one of a concentration level of hydrogen within the section, a concentration level of metal particles in the hydrogen, a temperature value of the hydrogen, a pressure value of the hydrogen, a humidity value around the section, a deviation level of an electrochemical liquid within the sensor unit 102, and an image of the section of the hydrogen amenity. Further, the sensor unit 102 may be configured to generate sensor data for the section of the hydrogen amenity. The sensor data may include at least one of the concentration level of the hydrogen, the concentration level of the metal particles in the hydrogen, the temperature value of the hydrogen, the pressure value of the hydrogen, the humidity value around the section, the deviation level of the electrochemical liquid, and the image of the section of the hydrogen amenity. The sensor unit 102 may periodically, regularly, or at a pre-determined time transmit the sensor data to the hydrogen leakage detection unit 104.

In one example, the communication module 314 of the hydrogen leakage detection unit 104 may receive, from each of the sensor units 102, the sensor data for the corresponding section of the hydrogen amenity. The received sensor data may be saved in the sensor data 326 for further processing.

Subsequently, the processing engine 320 of the hydrogen leakage detection unit 104 may process the corresponding sensor data for the sensor units 102 to ascertain occurrence of a hydrogen leakage event at the corresponding section of the hydrogen amenity. The hydrogen leakage event may include at least one of the existing hydrogen leakage and the probable hydrogen leakage. The existing hydrogen leakage event may indicate that hydrogen leakage from the hydrogen amenity has already begun. The probable hydrogen leakage event may indicate that currently there is no leakage in the hydrogen amenity, but hydrogen is likely to leak in future if no preventive action is taken. In an example, the processing engine 320 of the hydrogen leakage detection unit 104 may analyze the sensor data utilizing historical data and predetermined thresholds for determining occurrence of the hydrogen leakage event and the type of the hydrogen leakage event.

In an example, the processing engine 320 of the hydrogen leakage detection unit 104 may analyze the sensor data using a pre-trained leakage detection model to ascertain the occurrence of the hydrogen leakage event. The pre-trained leakage detection model may be developed based on statistical analysis of historical variations in the sensor data associated to the hydrogen leakage event.

As may be understood, a hydrogen leakage event may occur owing to various causes. For example, degradation of the material of the hydrogen amenity due to aging may lead to the occurrence of the hydrogen leakage event. Further, improper tightening of the valves 304 or welding defects at joints while manufacturing of the hydrogen amenity may be a cause of the occurrence of the hydrogen leakage event. Further, mechanical damages to the hydrogen amenity due to external factors such as excavation activities, landslides, or seismic events may result in cracks, punctures, or fractures, thereby causing the occurrence of the hydrogen leakage event. Further, the hydrogen within the hydrogen amenity may induce hydrogen embrittlement, a phenomenon in which the hydrogen atoms diffuse into the material of the hydrogen amenity and weaken the structure of the hydrogen amenity leading to corrosion. Corrosion leads to the formation of cracks and increases the likelihood of the occurrence of the hydrogen leakage event. Corrosion may be accelerated by factors such as storage or transportation of high-pressure hydrogen, impurities in the hydrogen, or inadequate corrosion protection measures. Another cause leading to the occurrence of the hydrogen leakage event may be seal and gasket failure. Seals and gaskets are used to ensure proper sealing between the sections of the hydrogen storage facilities, hydrogen transportation lines, valves 304, and other components of the system 100. Over time, the seals and gaskets may degrade, become brittle, or develop gaps, allowing the hydrogen within the hydrogen amenity to escape.

The various causes for the occurrence of the hydrogen leakage event may also lead to introduction of metal particles from the material of the hydrogen amenity into the hydrogen within the hydrogen amenity. Introduction of metal particles in the hydrogen, formation of cracks, punctures, etc., or leakage of the hydrogen may lead to changes in the concentration of the hydrogen within the hydrogen amenity, the concentration level of metal particles in the hydrogen, the temperature value of the hydrogen, the pressure value of the hydrogen, the humidity value around the hydrogen amenity, and the deviation level of the electrochemical liquid within the sensor unit 102. Further, the cracks, punctures, etc., in the hydrogen amenity may be identified through the image of the hydrogen amenity.

In an example, the processing engine 320 may compare the sensor data 326 with one or more predetermined thresholds for detecting the changes in the sensor data 326 that have occurred due to the causes described above. The predetermined thresholds may be determined by the processing engine 320 based on the dimensions, such as length, height, or volume of the hydrogen amenity and ideal values of the sensor data 326 for the hydrogen amenity. For example, if the concentration level of hydrogen within the hydrogen amenity is less than a first predetermined threshold value of hydrogen concentration, a probable hydrogen leakage may be ascertained. Whereas if the concentration level of hydrogen within the hydrogen amenity is less than a second predetermined threshold value of hydrogen concentration, an existing hydrogen leakage may be ascertained. In said example, the first predetermined threshold value of hydrogen concentration may be greater than the second predetermined threshold value of hydrogen concentration. Similarly, threshold values for the other parameters, i.e., the concentration level of metal particles, the temperature value, the pressure value, the humidity value, and the deviation level may be predetermined. The threshold values for the other parameters may be compared with corresponding values for the other parameters in the received sensor data 326 to ascertain the occurrence of the hydrogen leakage event.

The processing engine 320 may also compare the image of the section of the hydrogen amenity with one or more predetermined patterns to confirm whether the predetermined patterns are present in the image, and to detect the changes in the image that have occurred due to the causes described above. The predetermined patterns may be determined by the processing engine 320 based on analysis of the historical images of the hydrogen amenity which are associated with the hydrogen leakage event. The predetermined patterns may be associated with the probable hydrogen leakage or the existing hydrogen leakage. Upon determining that the image of the section of the hydrogen amenity includes a predetermined pattern that is associated with the probable hydrogen leakage, the processing engine 320 may ascertain the occurrence of the probable hydrogen leakage. Similarly, upon determining, based on the comparison, that the image of the section of the hydrogen amenity includes a predetermined pattern that is associated with the existing hydrogen leakage, the processing engine 320 may ascertain the occurrence of the existing hydrogen leakage.

In another example, the pre-trained leakage detection model may be used by the processing engine 320 to ascertain the occurrence of the hydrogen leakage event. The pre-trained leakage detection model may be developed based on analysis of the trends and patterns of historical variations in the sensor data 326 at and around the time of occurrence of the hydrogen leakage event due to various causes as previously described. The pre-trained leakage detection model may compare the sensor data 326 received over a period of time to find out the trends and patterns of the sensor data 326. The trends and patterns of the sensor data 326 may be compared with the trends and patterns of the historical variations in the sensor data to ascertain the occurrence of the hydrogen leakage. Therefore, developing the pre-trained leakage detection model based on statistical analysis of historical variations in the sensor data 326 enables the system 100 to detect or predict hydrogen leakage quickly and accurately.

In another example, the processing engine 320 may determine an ideal value of a prediction metric $E_0$ during an initial deployment stage of the hydrogen amenity and the sensor units 102. The ideal value of the prediction metric $E_0$ may be determined based on an ideal value of each parameter, i.e., the concentration level of the hydrogen, the concentration level of metal particles, the temperature value, the pressure value, the humidity value, and the deviation level, of the sensor data 326 sensed by the sensor units 102 during the initial deployment stage. The ideal values of the parameters may be different for different conditions, such as type of hardware, weather, stress, strain, etc. Thus, based on the ideal values of the parameters, the hydrogen leakage detection unit 104 may be calibrated in the initial deployment stage. Each parameter in the sensor data 326 may be assigned a respective weightage utilizing the pre-trained leakage detection model. The pre-trained leakage detection model may analyze relative importance of each parameter for the occurrence of the hydrogen leakage event. For example, the concentration level of metal particles may be assigned higher weightage than the other parameters based on a determination, by the pre-trained leakage detection model, that even a slight variation in the concentration level of metal particles causes the occurrence of the hydrogen leakage event. Any parameter may be assigned the highest weightage by the pre-trained leakage detection model based on the conditions specific to the hydrogen amenity. The prediction metric $E_0$ may be calculated based on equation (1) given below:

$$E_0 = A_1M + A_2P + A_3T + A_4H + A_5E + A_6C \quad \text{equation (1)}$$

In equation (1), $E_0$ represents the prediction metric, M represents the concentration level of the metal particles having a weightage $A_1$, P represents the pressure value having a weightage $A_2$, T represents the temperature value having a weightage $A_3$, H represents the humidity value having a weightage $A_4$, E represents the deviation level of the electrochemical liquid having a weightage $A_5$, C represents the concentration level of the hydrogen having a weightage $A_6$.

The processing engine 320 may determine a real-time value of the prediction metric $E_0$ during the real-time operating stage of the hydrogen amenity and the sensor units 102. The processing engine 320 may compare the ideal value of the prediction metric $E_0$ with the real-time value of the prediction metric $E_0$. Based on the comparison, the processing engine 320 may ascertain the occurrence of the hydrogen leakage event. For example, if an absolute difference between the ideal value of the prediction metric $E_0$ and the real-time value of the prediction metric $E_0$ is greater than a pre-determined difference threshold, the processing engine 320 may ascertain the occurrence of the hydrogen leakage event. The pre-determined difference threshold may be determined by the pre-trained leakage detection model based on at least one of the dimensions, such as length, height, or volume of the hydrogen amenity, the ideal value of the prediction metric $E_0$ for the hydrogen amenity, and historical values of the prediction metric $E_0$ at and around the time of occurrence of the hydrogen leakage event due to various causes as previously described.

Upon ascertaining occurrence of the hydrogen leakage event at a section of the hydrogen amenity, the damage prevention engine 322 of the hydrogen leakage detection unit 104 may initiate one or more preventive actions. Examples of the preventive actions may include, but are not limited to, communicating with the control unit 106 for shutting off supply of hydrogen to the section of the hydrogen amenity at which the hydrogen leakage event is ascertained, scheduling a downtime for the hydrogen amenity to enable repair of the hydrogen amenity, selecting a service technician to visit the hydrogen amenity for repairing the hydrogen amenity, and notifying the service technician about the hydrogen leakage event.

In an example, upon ascertaining that the hydrogen leakage event is the probable hydrogen leakage, the damage prevention engine 322 may utilize a pre-trained leakage time estimation model to determine an estimated leakage time for the probable hydrogen leakage based on the sensor data 326. The estimated leakage time may indicate the time within which the hydrogen is predicted to start leaking from the hydrogen amenity. In an example, the estimated leakage time may be indicated in number of hours or days. The pre-trained leakage time estimation model may be developed based on statistical analysis of historical variations in the sensor data 326 associated to the hydrogen leakage event.

In an example, the pre-trained leakage time estimation model may be used by the damage prevention engine 322 to determine the estimated leakage time. The pre-trained leakage time estimation model may be developed based on analysis of the trends and patterns of historical variations in the sensor data 326 or the prediction metric $E_0$ at and around the time of occurrence of the hydrogen leakage event due to various causes as previously described. In an example, the pre-trained leakage time estimation model may compare the sensor data 326 received over a period of time to find out the trends and patterns of the sensor data 326. In another example, the pre-trained leakage time estimation model may compare the values of the prediction metric $E_0$ calculated over a period of time to find out the trends and patterns of the prediction metric $E_0$. The trends and patterns of the sensor data 326 or the prediction metric $E_0$ may be used as a basis by the pre-trained leakage time estimation model to predict the estimated leakage time. Therefore, developing the pre-trained leakage time estimation model based on statistical analysis of historical variations in the sensor data 326 or the prediction metric $E_0$ enables the system 100 to determine or predict the estimated leakage time quickly and accurately.

Subsequently, the damage prevention engine 322 may schedule a downtime for the hydrogen amenity based on the estimated leakage time to enable repair of the section of the hydrogen amenity. The downtime may be defined as a time at which the hydrogen amenity is to be kept inoperative for enabling repair of the section of the hydrogen amenity at which the hydrogen leakage is predicted to occur.

In an example, the damage prevention engine 322 may select a service technician, from a plurality of service technicians, to visit the hydrogen amenity during the downtime to repair the section of the hydrogen amenity determined to have the probable hydrogen leakage. The service technician may be selected based on one or more selection criteria including at least one of a service rating of the corresponding service technician and a distance of the corresponding service technician from the corresponding section of the hydrogen amenity. In an example, the service rating of the service technician may be indicative of the past performance or an experience of the service technician in handling the repair the hydrogen amenity. In an example, the distance of the corresponding service technician from the corresponding section of the hydrogen amenity may be determined based on a distance of the user device 302 of the service technician from the corresponding section of the hydrogen amenity. The distance of the user device 302 may be determined based on a location of the user device 302 that may be stored in the technician data 328. In another example, the distance of the corresponding service technician from the corresponding section of the hydrogen amenity may be determined based on a distance of a workplace of the service technician from the corresponding section of the hydrogen amenity. The distance of the workplace may be determined based on a location of the workplace that may be stored in the technician data 328.

Subsequently, the damage prevention engine 322 may generate an alert notification. The alert notification may include identification data for at least one of the hydrogen amenity and the section of the hydrogen amenity. In one example, the alert notification may indicate identification data for either the hydrogen amenity or the section of the hydrogen amenity depending on various factors, such as the size of the entire hydrogen amenity and the type of hydrogen amenity, such as hydrogen storage and transportation amenity. For instance, in case the hydrogen amenity is a transportation pipe it may be beneficial to indicate the exact location of the section of the hydrogen amenity as the transportation pipe may extend over a long distance. Similarly, in case of a small storage facility, the data, such as location of the hydrogen amenity may be sufficient, whereas in case of a huge storage facility, the data of only the section or both the section and the hydrogen amenity may be provided.

The alert notification may also include at least one of an indication of the probable hydrogen leakage, the estimated leakage time, and the down time for the hydrogen amenity. Examples of the identification data of the hydrogen amenity may include, but are not limited to, a location of the hydrogen amenity, an identifier associated to the hydrogen amenity, and any data that enables identification of the hydrogen amenity. Examples of the identification data of the section of the hydrogen amenity may include, but are not limited to, a location of the section of the hydrogen amenity, an identifier associated to the section of the hydrogen amenity, and any data that enables identification of the section of the hydrogen amenity. The indication of the probable hydrogen leakage may be any indication indicating that the hydrogen leakage is likely to occur. Examples of the indication of the probable hydrogen leakage may include, but are not limited to, a visual representation including texts, symbols, etc., and/or an audio indication such as a warning played through a speaker.

Subsequently, the communication module 314 may transmit the alert notification to the user device 302 of the selected service technician. For example, the communication module 314 may transmit the alert notification to the user device 302-1 of a first service technician. In an example, the communication module 314 may also transmit the alert notification to a plurality of user devices 302. For example, the communication module 314 may transmit the alert notification to both the user devices 302-1 and 302-2. Upon receiving the alert notification on the user device 302, the service technician may visit the hydrogen amenity according to the downtime to repair the section of the hydrogen amenity determined to have the probable hydrogen leakage.

In an example, the communication module 314 may further transmit a downtime schedule, indicating the scheduled downtime, to the control unit 106 associated with the hydrogen amenity to stop supply of hydrogen to the hydrogen amenity during the downtime. The downtime schedule may be indicative of the time for scheduling downtime of the hydrogen amenity. As previously described, the control unit 106 may be configured to control supply of hydrogen to the hydrogen amenity. In response to receiving the downtime schedule, the control unit 106 may operate the one or more valves 304 according to the downtime schedule to discontinue supply of hydrogen to the section of the hydrogen amenity during the downtime.

In an example, upon ascertaining that the hydrogen leakage event is the probable hydrogen leakage, the damage prevention engine 322 may determine a hydrogen leakage amount based on the sensor data 326. The hydrogen leakage amount may indicate the amount of hydrogen that has already leaked from the hydrogen amenity.

Subsequently, the damage prevention engine 322 may generate a site visit recommendation based on a comparison of the hydrogen leakage amount and a safe hydrogen level threshold. The safe hydrogen level threshold may indicate an amount of hydrogen leakage below which it is safe for the service technician to visit the hydrogen amenity. In an example, the site visit recommendation may indicate whether it is safe for the service technician to visit the hydrogen amenity immediately. In another example, the site visit recommendation may indicate a time until or after which it may not be safe for the service technician to visit the hydrogen amenity.

Further, the damage prevention engine 322 may select the service technician, from a plurality of service technicians, to visit the hydrogen amenity as per the site visit recommendation, to repair the section of the hydrogen amenity determined to have the existing hydrogen leakage. The service technician may be selected based on one or more selection criteria including at least one of a service rating of the corresponding service technician and a distance of the corresponding service technician from the corresponding section of the hydrogen amenity, as previously described.

Subsequently, the damage prevention engine 322 may generate an alert notification. The alert notification may include the identification data for at least one of the hydrogen amenity and the section of the hydrogen amenity, as previously described. The alert notification may also include at least one of an indication of the existing hydrogen leakage, the hydrogen leakage amount, and the site visit recommendation. The indication of the existing hydrogen leakage may be any indication indicating that the hydrogen leakage is currently occurring. Examples of the indication of the existing hydrogen leakage may include, but are not limited to, a visual representation including texts, symbols, etc., and/or an audio indication such as a warning played through a speaker.

Subsequently, the communication module 314 may transmit the alert notification to the user device 302 of the selected service technician. For example, the communication module 314 may transmit the alert notification to the user device 302-1 of a first service technician. In an example, the communication module 314 may also transmit the alert notification to a plurality of user devices 302. For example, the communication module 314 may transmit the alert notification to both the user devices 302-1 and 302-2. Upon receiving the alert notification on the user device 302, the service technician may visit the hydrogen amenity according to the site visit recommendation to repair the section of the hydrogen amenity determined to have the existing hydrogen leakage.

In an example, the damage prevention engine 322 may further generate a discontinuation signal to initiate discontinuation of supply of hydrogen to the section of the hydrogen amenity. The discontinuation signal may indicate that the supply of hydrogen to the section of the hydrogen amenity is to be discontinued immediately upon reception of the discontinuation signal at the control unit 106. Subsequently, the communication module 314 may transmit the discontinuation signal to the control unit 106 configured to control supply of hydrogen to the hydrogen amenity. The control unit 106 may receive the discontinuation signal from the hydrogen leakage detection unit 104.

In response to receiving the discontinuation signal, the control unit 106 may operate the valves 304 to immediately discontinue the supply of hydrogen to the section of the hydrogen amenity.

FIG. 4 and FIG. 5A to FIG. 5D illustrate example methods 400 and 500, respectively, for detecting hydrogen leakage in a hydrogen amenity. The order in which the methods are described is not intended to be construed as a limitation, and any number of the described method blocks may be combined in any order to implement the methods, or an alternative method. Further, the methods 400 and 500 may be implemented by processing resource or computing device(s) through any suitable hardware, non-transitory machine-readable instructions, or combination thereof.

It may also be understood that methods 400 and 500 may be performed by programmed computing devices, such as the hydrogen leakage detection unit 104, as depicted in FIG. 1, FIG. 3A, and FIG. 3B. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 400 and 500 are described below with reference to the hydrogen leakage detection unit 104 and the system 100 as described above; other suitable systems for the execution of these methods may also be utilized. Additionally, implementation of these methods is not limited to such examples.

Figure 4:
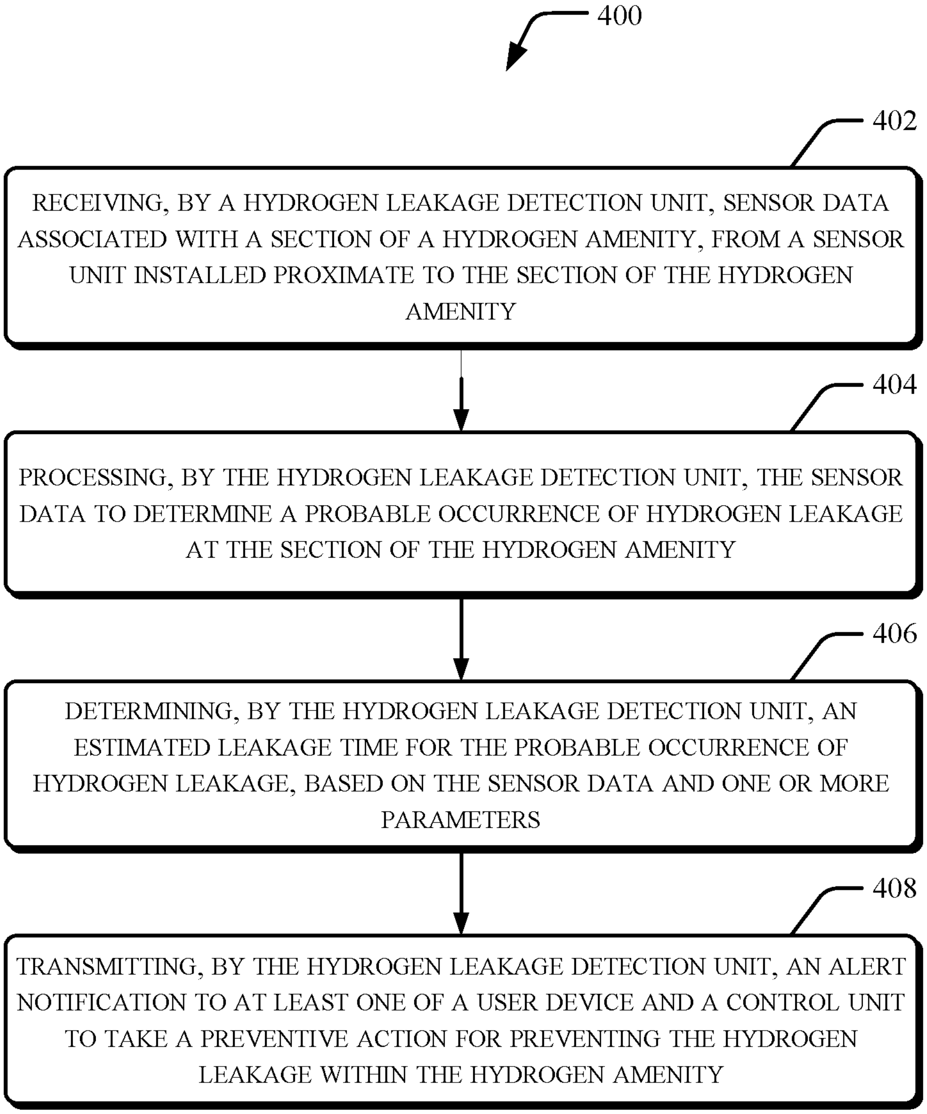
FIG. 4 illustrates a method for detecting hydrogen leakage in a hydrogen amenity, according to an example.

FIG. 4 illustrates the method 400 for detecting hydrogen leakage in a hydrogen amenity, according to an example.

At block 402, sensor data associated with a section of a hydrogen amenity may be received, by a hydrogen leakage detection unit, say the hydrogen leakage detection unit 104, from a sensor unit, say the sensor unit 102. In one example, the hydrogen amenity may be one of a hydrogen storage facility and a hydrogen transportation line and the sensor unit may be installed proximate to the section of the hydrogen amenity. The sensor data may include at least one of a concentration level of hydrogen within the section of the hydrogen amenity, a concentration level of metal particles in the hydrogen, a temperature value of the hydrogen, a pressure value of the hydrogen, and an image of the section of the hydrogen amenity.

At block 404, the sensor data may be processed, by the hydrogen leakage detection unit, to determine a probable occurrence of hydrogen leakage at the section of the hydrogen amenity. The probable occurrence of hydrogen leakage may indicate that currently there is no leakage in the hydrogen amenity, but hydrogen is likely to leak in future if no preventive action is taken.

At block 406, an estimated leakage time for the probable occurrence of hydrogen leakage may be determined. In one example, the hydrogen leakage detection unit may determine the estimated leakage time based on the sensor data. The estimated leakage time may indicate the time within which the hydrogen is predicted to start leaking from the hydrogen amenity. In an example, the estimated leakage time may be indicated in number of hours or days.

At block 408, an alert notification may be transmitted. In one example, the hydrogen leakage detection unit may transmit the alert notification to at least one of a user device, say the user device 302, and a control unit, say the control unit 106, to take a preventive action for preventing the hydrogen leakage within the hydrogen amenity. Examples of the preventive action may include, but are not limited to, communicating with the control unit 106 for scheduling discontinuation of supply of hydrogen to the section of the hydrogen amenity; scheduling a downtime for the hydrogen amenity to enable repair of the hydrogen amenity; selecting a service technician to visit the hydrogen amenity for repairing the hydrogen amenity; and notifying the service technician about the probable occurrence of hydrogen leakage. In one example, the alert notification may include identification data for at least one of the hydrogen amenity and the section of the hydrogen amenity.

The alert notification may further include at least one of an indication of the probable occurrence of hydrogen leakage and the estimated leakage time. Examples of the identification data of the hydrogen amenity may include, but are not limited to, a location of the hydrogen amenity, an identifier associated to the hydrogen amenity, and any data that enables identification of the hydrogen amenity. Examples of the identification data of the section of the hydrogen amenity may include, but are not limited to, a location of the section of the hydrogen amenity, an identifier associated with the section of the hydrogen amenity, and any data that enables identification of the section of the hydrogen amenity. The indication of the probable occurrence of hydrogen leakage may be any indication indicating that the hydrogen leakage is likely to occur. Examples of the indication of the probable hydrogen leakage may include, but are not limited to, a visual representation including texts, symbols, etc., and/or an audio indication such as a warning played through a speaker.

FIG. 5A, FIG. 5B, FIG. 5C, and FIG. 5D illustrate the method 500 for detecting hydrogen leakage in a hydrogen amenity, according to an example.

At block 502, a section of the hydrogen amenity for installing a sensor unit, say the sensor unit 102, may be determined. In one example, the section may be determined based on at least one of an aperture of the sensor unit, a material of the hydrogen amenity, and a material of the sensor unit. The hydrogen amenity may be one of a hydrogen storage facility and a hydrogen transportation line. In an example, the hydrogen amenity and/or the sensor unit may be manufactured using a chemochromic pigment for early detection or prediction of the hydrogen leakage in the hydrogen amenity. In an example, the aperture of the sensor unit may be indicative of a dimension, such as the length or the surface area of the hydrogen amenity for which the sensor unit may sense and generate the sensor data. Thus, the aperture of the sensor unit may also define the part of the hydrogen amenity for which the sensor unit may effectively sense and generate the sensor data. Thus, the sensor units may be installed proximate to the determined section of the hydrogen amenity, such that the entirety or a required part of the hydrogen amenity is monitored using the sensor units.

At block 504, sensor data associated with a section of a hydrogen amenity may be received by a hydrogen leakage detection unit, say the hydrogen leakage detection unit 104, from the sensor unit that may be installed proximate to the section of the hydrogen amenity. The sensor data may include at least one of a concentration level of hydrogen within the section of the hydrogen amenity, a concentration level of metal particles in the hydrogen, a temperature value of the hydrogen, a pressure value of the hydrogen, and an image of the section of the hydrogen amenity.

At block 506, the sensor data may be analyzed to determine, at the section of the hydrogen amenity, at least one of an occurrence of the hydrogen leakage or a probable occurrence of hydrogen leakage. In one example implementation, the sensor data may be analyzed utilizing a pre-trained leakage detection model. The occurrence of hydrogen leakage may indicate that hydrogen leakage from the hydrogen amenity has already begun. The probable occurrence of hydrogen leakage may indicate that currently there is no leakage in the hydrogen amenity, but hydrogen is likely to leak in future if no preventive action is taken. The pre-trained leakage detection model may be developed based on statistical analysis of historical variations in the sensor data associated to the occurrence of the hydrogen leakage or the probable occurrence of hydrogen leakage.

At block 508, it may be determined whether the hydrogen leakage has occurred, for example, based on the analysis of the sensor data. If it is determined that the hydrogen leakage has occurred, the method 500 may then follow the Yes path and proceed to block A.

However, if it is determined that the hydrogen leakage has not occurred, the method 500 may then follow the No path and proceed to block 510.

At block 510, it may be ascertained whether the probable occurrence of hydrogen leakage is determined, for example, based on the analysis of the sensor data. If it is ascertained that the probable occurrence of hydrogen leakage is determined, the method 500 may then follow the Yes path and proceed to block B.

However, if the probable occurrence of hydrogen leakage is not determined, the method 500 may then follow the No path and proceed to block 504. The sensor data may thus be received and analyzed again for detection of the occurrence of hydrogen leakage or prediction of the probable occurrence of hydrogen leakage.

Figure 5A:
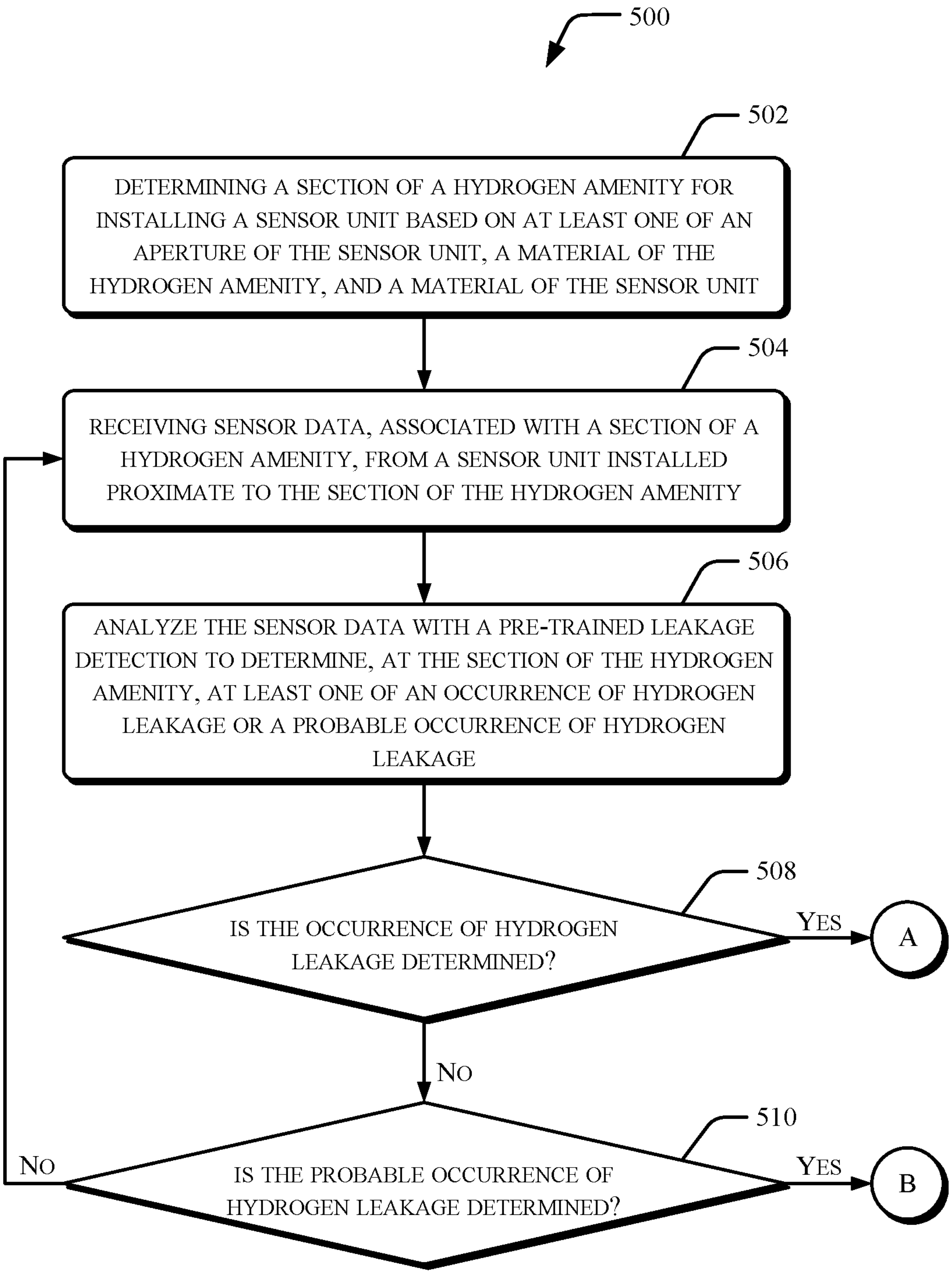
FIG. 5A to FIG. 5D illustrate a method for detecting hydrogen leakage in a hydrogen amenity, according to another example.
Figure 5B:
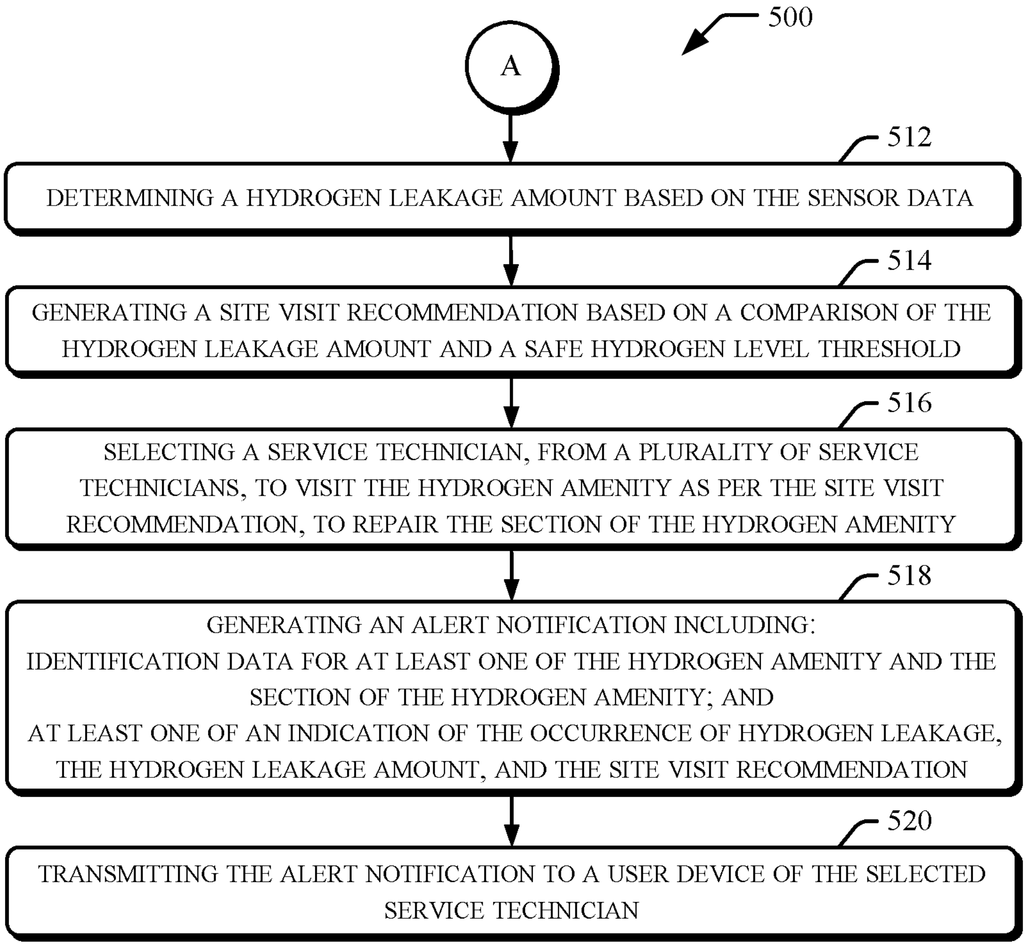

FIG. 5B illustrates the method 500 for taking preventive actions upon determining occurrence of hydrogen leakage, according to an example implementation of the present subject matter. The method continues from the block A of the method 500 of FIG. 5A.

At block 512, a hydrogen leakage amount may be determined. In one example, the hydrogen leakage amount may be determined based on the sensor data. The hydrogen leakage amount may indicate the amount of hydrogen that has already leaked from the hydrogen amenity.

At block 514, a site visit recommendation may be generated. In one example, the site visit recommendation may be generated based on a comparison of the hydrogen leakage amount and a safe hydrogen level threshold. The safe hydrogen level threshold may indicate an amount of hydrogen leakage below which it is safe for a service technician to visit the hydrogen amenity. In an example, the site visit recommendation may indicate whether it is safe for the service technician to visit the hydrogen amenity immediately. In another example, the site visit recommendation may indicate a time until or after which it may not be safe for the service technician to visit the hydrogen amenity.

At block 516, a service technician may be selected to visit the hydrogen amenity during the downtime. In one example, the service technician may be selected, from a plurality of service technicians, to visit the hydrogen amenity as per the site visit recommendation. The service technician may be selected to repair the section of the hydrogen amenity at which the occurrence of hydrogen leakage has been determined. In one example, the service technician may be selected based on one or more selection criteria including at least one of a service rating of the corresponding technician and a distance of the corresponding technician from the corresponding section of the hydrogen amenity. In an example, the service rating of the service technician may be indicative of the past performance or an experience of the service technician in handling the repair the hydrogen amenity. In an example, the distance of the corresponding service technician from the corresponding section of the hydrogen amenity may be determined based on a distance of the user device of the service technician from the corresponding section of the hydrogen amenity. The distance of the user device may be determined based on a location of the user device. In another example, the distance of the corresponding service technician from the corresponding section of the hydrogen amenity may be determined based on a distance of a workplace of the service technician from the corresponding section of the hydrogen amenity. The distance of the workplace may be determined based on a location of the workplace.

At block 518, an alert notification may be generated. In one example, the alert notification may include identification data for at least one of the hydrogen amenity and the section of the hydrogen amenity. The alert notification may further include at least one of an indication of the occurrence of hydrogen leakage, the hydrogen leakage amount, and the site visit recommendation. Examples of the identification data of the hydrogen amenity may include, but are not limited to, a location of the hydrogen amenity, an identifier associated to the hydrogen amenity, and any data that enables identification of the hydrogen amenity. Examples of the identification data of the section of the hydrogen amenity may include, but are not limited to, a location of the section of the hydrogen amenity, an identifier associated with the section of the hydrogen amenity, and any data that enables identification of the section of the hydrogen amenity. The indication of the occurrence of hydrogen leakage may be any indication indicating that the hydrogen is currently leaking from the hydrogen amenity. Examples of the indication of the occurrence of hydrogen leakage may include, but are not limited to, a visual representation including texts, symbols, etc., and/or an audio indication such as a warning played through a speaker.

At block 520, the alert notification may be transmitted to the user device. In an example, the alert notification may be transmitted to the user device of the selected service technician. In an example, the alert notification may be transmitted to a plurality of user devices. Each of the plurality of user devices may be associated with a corresponding service technician.

Figure 5C:
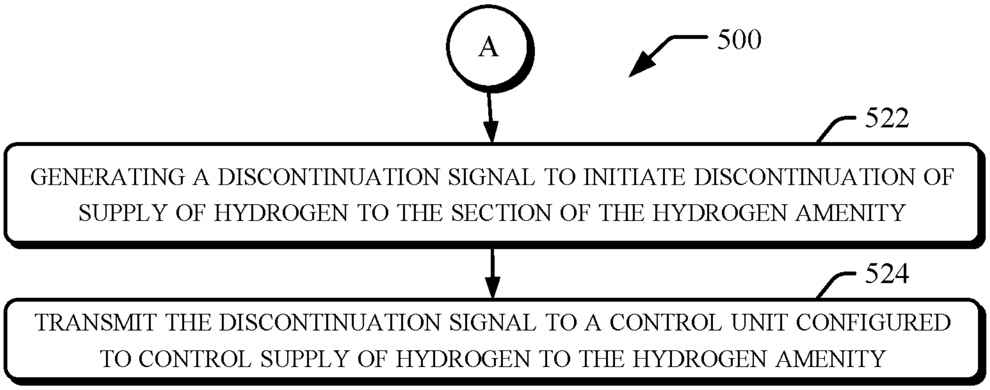

FIG. 5C illustrates the method 500 for taking preventive actions upon determining occurrence of hydrogen leakage, according to an example implementation of the present subject matter. The method continues from the block A of the method 500 of FIG. 5A.

At block 522, a discontinuation signal may be generated. In one example, the discontinuation signal may be generated to initiate discontinuation of supply of hydrogen to the section of the hydrogen amenity.

At block 545, the discontinuation signal may be transmitted to a control unit. In an example, the control unit may be configured to control supply of hydrogen to the hydrogen amenity.

Figure 5D:
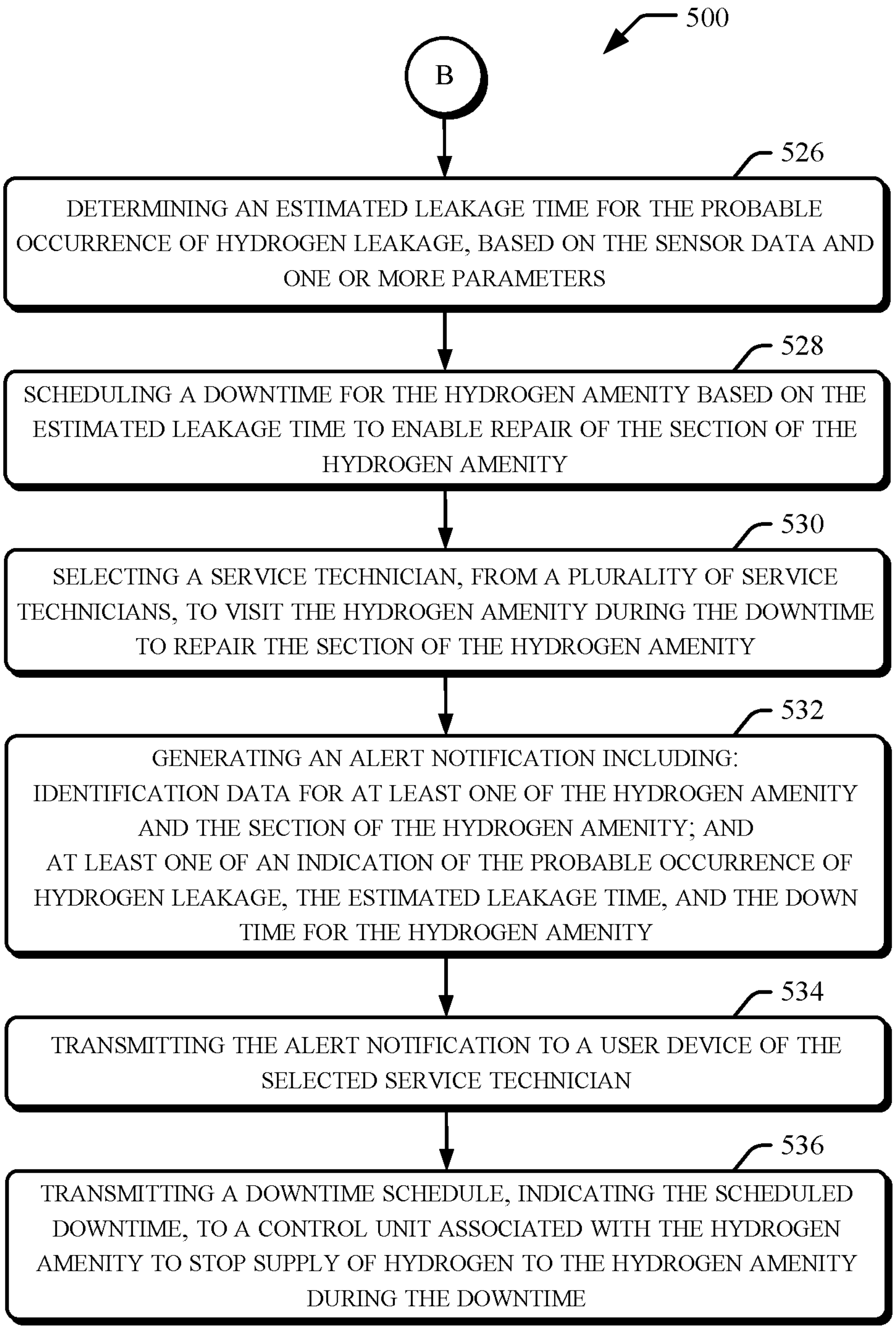

FIG. 5D illustrates the method 500 for taking preventive actions upon determining probable occurrence of hydrogen leakage, according to an example implementation of the present subject matter. The method continues from the block B of the method 500 of FIG. 5A.

At block 526, an estimated leakage time for the probable occurrence of hydrogen leakage may be determined. In one example, the estimated leakage time may be determined based on the sensor data. The estimated leakage time may indicate the time within which the hydrogen is predicted to start leaking from the hydrogen amenity. In an example, the estimated leakage time may be indicated in number of hours or days. In an example, the estimated leakage time may be determined based on the sensor data utilizing a pre-trained leakage time estimation model as explained with reference to the damage prevention engine 322 of FIG. 3A. The pre-trained leakage time estimation model is developed based on statistical analysis of historical variations in the sensor data associated to the probable occurrence of hydrogen leakage.

At block 528, a downtime may be scheduled for the hydrogen amenity. In one example, the hydrogen leakage detection unit may schedule the downtime for the hydrogen amenity based on the estimated leakage time to enable repair of the section of the hydrogen amenity. The downtime may be defined as a time at which the hydrogen amenity is to be kept inoperative for enabling repair of the section of the hydrogen amenity at which the probable occurrence of hydrogen leakage is determined. In an example, a downtime schedule, indicating the scheduled downtime, may be generated. In one example, the hydrogen leakage detection unit may generate the downtime schedule.

At block 530, a service technician may be selected to visit the hydrogen amenity during the downtime. In one example, the service technician may be selected, from a plurality of service technicians, to repair the section of the hydrogen amenity determined to have the probable occurrence of hydrogen leakage. In one example, the service technician may be selected based on one or more selection criteria including at least one of a service rating of the corresponding service technician and a distance of the corresponding service technician from the corresponding section of the hydrogen amenity. In an example, the service rating of the service technician may be indicative of the past performance or an experience of the service technician in handling the repair the hydrogen amenity. In an example, the distance of the corresponding service technician from the corresponding section of the hydrogen amenity may be determined based on a distance of the user device of the service technician from the corresponding section of the hydrogen amenity. The distance of the user device may be determined based on a location of the user device. In another example, the distance of the corresponding service technician from the corresponding section of the hydrogen amenity may be determined based on a distance of a workplace of the service technician from the corresponding section of the hydrogen amenity. The distance of the workplace may be determined based on a location of the workplace.

At block 532, an alert notification may be generated. In one example, the alert notification may include identification data for at least one of the hydrogen amenity and the section of the hydrogen amenity. The alert notification may further include at least one of an indication of the probable occurrence of hydrogen leakage, the estimated leakage time, and the down time for the hydrogen amenity. Examples of the identification data of the hydrogen amenity may include, but are not limited to, a location of the hydrogen amenity, an identifier associated to the hydrogen amenity, and any data that enables identification of the hydrogen amenity. Examples of the identification data of the section of the hydrogen amenity may include, but are not limited to, a location of the section of the hydrogen amenity, an identifier associated with the section of the hydrogen amenity, and any data that enables identification of the section of the hydrogen amenity. The indication of the probable hydrogen leakage may be any indication indicating that the hydrogen leakage is likely to occur. Examples of the indication of the probable hydrogen leakage may include, but are not limited to, a visual representation including texts, symbols, etc., and/or an audio indication such as a warning played through a speaker.

At block 534, the alert notification may be transmitted to the user device. In an example, the alert notification may be transmitted to the user device of the selected service technician. In an example, the alert notification may be transmitted to a plurality of user devices. Each of the plurality of user devices may be associated to a corresponding service technician. Upon receiving the alert notification on the user device 302, the service technician may visit the hydrogen amenity according to the downtime to repair the section of the hydrogen amenity determined to have the probable hydrogen leakage.

At block 536, a downtime schedule may be transmitted to a control unit that is associated with the hydrogen amenity. In an example, the downtime schedule may indicate the scheduled downtime. In an example, the downtime schedule may be transmitted may be transmitted to the control unit to stop supply of hydrogen to the hydrogen amenity during the downtime. The control unit may be configured to control supply of hydrogen to the hydrogen amenity.

Figure 6:
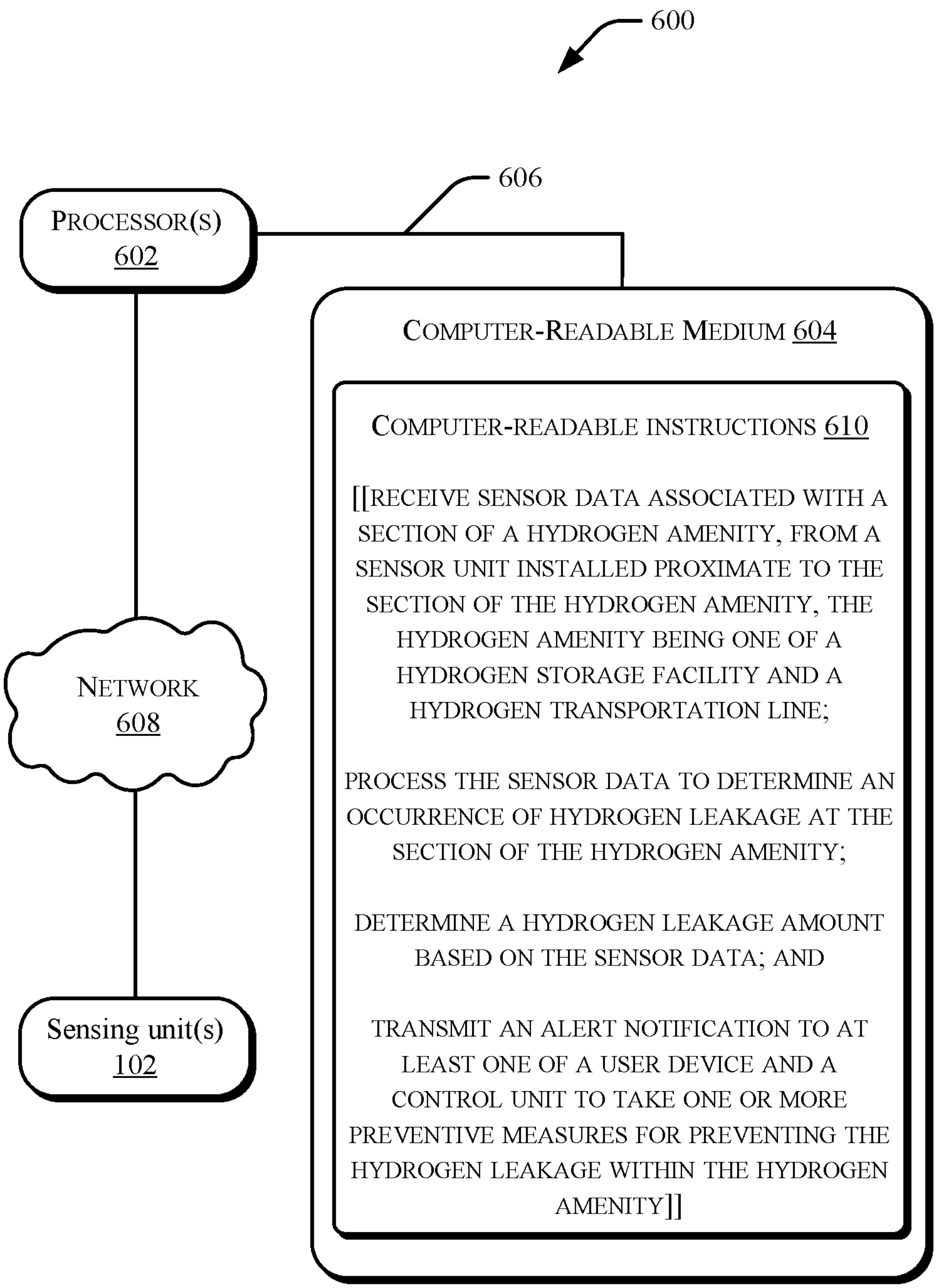
FIG. 6 illustrates a computing environment implementing a non-transitory computer readable medium for detecting hydrogen leakage in a hydrogen amenity, according to an example.

FIG. 6 illustrates a computing environment 600 implementing a non-transitory computer readable medium for detecting hydrogen leakage in a hydrogen amenity, according to an example. In an example, the computing environment 600 includes processor(s) 602 communicatively coupled to a non-transitory computer readable medium 604 through a communication link 606. In one example, the communication link 606 may be similar to the communication network 306, as described in conjunction with the preceding figures. In an example implementation, the computing environment 600 may be for example, the computing environment 300. In an example, the processor(s) 602 may have one or more processing resources for fetching and executing computer-readable instructions from the non-transitory computer readable medium 604. The processor(s) 602 and the non-transitory computer readable medium 604 may be implemented, for example, in the hydrogen leakage detection unit 104 (as has been described in conjunction with the preceding figures).

The non-transitory computer readable medium 604 may be, for example, an internal memory device or an external memory device. In an example implementation, the communication link 606 may be a network communication link. The processor(s) 602 and the non-transitory computer readable medium 604 may also be communicatively coupled to one or more sensor units 102 over a network 608. The network 608 may similar to the communication network 306 described in conjunction with FIG. 3A and FIG. 3B.

In an example implementation, the non-transitory computer readable medium 604 may include a set of computer readable instructions 608 which may be accessed by the processor(s) 602 through the communication link 606. Referring to FIG. 6, in an example, the non-transitory computer readable medium 604 may include instructions 610 that may cause the processor(s) 602 to receive sensor data associated with a section of a hydrogen amenity, from a sensor unit, such as the sensor unit 102, installed proximate to the section of the hydrogen amenity. As described previously, the hydrogen amenity may be one of a hydrogen storage facility and a hydrogen transportation line. Further, the sensor data may include at least one of a concentration level of hydrogen within the section of the hydrogen amenity, a concentration level of metal particles in the hydrogen, a temperature value of the hydrogen, a pressure value of the hydrogen, and an image of the section of the hydrogen amenity. In an example, the instructions 608 may cause the processor(s) 602, through the communication link 606, to receive the sensor data from the sensor unit 102 through the network 608.

The instructions 608 may further cause the processor(s) 602, in one example, to process the sensor data to determine an occurrence of hydrogen leakage at the section of the hydrogen amenity. The occurrence of hydrogen leakage may indicate that hydrogen leakage from the hydrogen amenity has already begun.

In one example, the instructions 608 may further cause the processor(s) 602 to determine a hydrogen leakage amount based on the sensor data. The hydrogen leakage amount may indicate the amount of hydrogen that has already leaked from the hydrogen amenity.

In one example, the instructions 608 may further cause the processor(s) 602 to transmit an alert notification to at least one of a user device and a control unit to take one or more preventive measures for preventing the hydrogen leakage within the hydrogen amenity. The alert notification may include identification data for at least one of the hydrogen amenity and the section of the hydrogen amenity. The alert notification may also include at least one of an indication of the occurrence of hydrogen leakage, the hydrogen leakage amount, and a site visit recommendation, generated based on the hydrogen leakage amount, for a user of the user device. Examples of the preventive measures may include, but are not limited to, communicating with the control unit 106 for immediate discontinuation of supply of hydrogen to the section of the hydrogen amenity, selecting a service technician to visit the hydrogen amenity for repairing the hydrogen amenity, and notifying the service technician about the occurrence of hydrogen leakage.

In one example, the instructions 608 may further cause the processor(s) 602 to analyze the sensor data with a pre-trained leakage detection model to determine the occurrence of hydrogen leakage. The pre-trained leakage detection model may be developed based on statistical analysis of historical variations in the sensor data associated to the occurrence of hydrogen leakage.

In one example, the instructions 608 may further cause the processor(s) 602 to generate a discontinuation signal to initiate discontinuation of supply of hydrogen to the section of the hydrogen amenity. The discontinuation signal may indicate that the supply of hydrogen to the section of the hydrogen amenity is to be discontinued immediately.

In one example, the instructions 608 may further cause the processor(s) 602 to transmit the discontinuation signal to the control unit configured to control supply of hydrogen to the hydrogen amenity.

In one example, the instructions 608 may further cause the processor(s) 602 to generate the site visit recommendation based on a comparison of the hydrogen leakage amount and a safe hydrogen level threshold. The safe hydrogen level threshold may indicate an amount of hydrogen leakage below which it is safe for a service technician to visit the hydrogen amenity. In an example, the site visit recommendation may indicate whether it is safe for the service technician to visit the hydrogen amenity immediately. In another example, the site visit recommendation may indicate a time until or after which it may not be safe for the service technician to visit the hydrogen amenity.

In one example, the instructions 608 may further cause the processor(s) 602 to select a service technician, from a plurality of service technicians, based on one or more selection criteria including at least one of a service rating of the corresponding service technician and a distance of the corresponding service technician from the section of the hydrogen amenity. In an example, the alert notification may be transmitted to the user device associated to the selected service technician. In an example, the service rating of the service technician may be indicative of the past performance or an experience of the service technician in handling the repair the hydrogen amenity. In an example, the distance of the corresponding service technician from the corresponding section of the hydrogen amenity may be determined based on a distance of the user device of the service technician from the corresponding section of the hydrogen amenity. The distance of the user device may be determined based on a location of the user device. In another example, the distance of the corresponding service technician from the corresponding section of the hydrogen amenity may be determined based on a distance of a workplace of the service technician from the corresponding section of the hydrogen amenity. The distance of the workplace may be determined based on a location of the workplace.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:

a hydrogen leakage detection unit communicably coupled with one or more sensor units, each of the one or more sensor units being installed proximate to a corresponding section of a hydrogen amenity, the hydrogen amenity being one of a hydrogen storage facility and a hydrogen transportation line, the hydrogen leakage detection unit comprising:

a communication module to receive, from each of the one or more sensor units, sensor data for the corresponding section of the hydrogen amenity, wherein the sensor data corresponding to a section of the hydrogen amenity includes at least one of a concentration level of hydrogen within the section, a concentration level of metal particles in the hydrogen, a temperature value of the hydrogen, a pressure value of the hydrogen, a humidity value around the section, a deviation level of an electrochemical liquid within a respective sensor unit of the one or more sensor units, and an image of the section of the hydrogen amenity;

a processing engine to process, for each of the one or more sensor units, the corresponding sensor data to ascertain occurrence of a hydrogen leakage event at the corresponding section of the hydrogen amenity, the hydrogen leakage event including at least one of an existing hydrogen leakage and a probable hydrogen leakage; and a damage prevention engine configured to:

determine, utilizing a pre-trained leakage time estimation model, an estimated leakage time for the probable hydrogen leakage based on the sensor data, wherein the pre-trained leakage time estimation model is developed based on statistical analysis of historical variations in the sensor data associated to the hydrogen leakage event;

schedule a downtime for the hydrogen amenity based on the estimated leakage time to enable repair of the section of the hydrogen amenity; and initiate one or more preventive actions upon ascertaining occurrence of the hydrogen leakage event at a section of the hydrogen amenity.

2. The system of claim 1, wherein, for the hydrogen leakage event being the probable hydrogen leakage, the damage prevention engine is configured to:

select a service technician, from a plurality of service technicians, to visit the hydrogen amenity during the downtime to repair the section of the hydrogen amenity determined to have the probable hydrogen leakage, wherein the service technician is selected based on at least one of a service rating of the corresponding service technician and a distance of the corresponding service technician from the corresponding section of the hydrogen amenity; and generate an alert notification including:

identification data for at least one of the hydrogen amenity and the section of the hydrogen amenity; and at least one of an indication of the probable hydrogen leakage, the estimated leakage time, and the downtime for the hydrogen amenity; and the communication module is to transmit the alert notification to a user device of the selected service technician and transmit a downtime schedule, indicating the scheduled downtime, to a control unit associated with the hydrogen amenity to stop supply of hydrogen to the hydrogen amenity during the downtime, wherein the control unit is configured to control supply of hydrogen to the hydrogen amenity.

3. The system of claim 1, wherein, for the hydrogen leakage event being the existing hydrogen leakage, the damage prevention engine is configured to:

generate a discontinuation signal to initiate discontinuation of supply of hydrogen to the section of the hydrogen amenity;

determine a hydrogen leakage amount based on the sensor data;

generate a site visit recommendation based on a comparison of the hydrogen leakage amount and a safe hydrogen level threshold;

select a service technician, from a plurality of service technicians, to visit the hydrogen amenity as per the site visit recommendation, to repair the section of the hydrogen amenity determined to have the existing hydrogen leakage, wherein the service technician is selected based on at least one of a service rating of the corresponding technician and a distance of the corresponding technician from the corresponding section of the hydrogen amenity; and generate an alert notification including:

identification data for at least one of the hydrogen amenity and the section of the hydrogen amenity; and at least one of an indication of the existing hydrogen leakage, the hydrogen leakage amount, and the site visit recommendation.

4. The system of claim 3, wherein the communication module is configured to:

transmit the alert notification to a user device of the selected service technician; and transmit the discontinuation signal to a control unit configured to control supply of hydrogen to the hydrogen amenity.

5. The system of claim 1, wherein the system comprises:

a control unit communicably coupled to the hydrogen leakage detection unit and one or more valves installed at the hydrogen amenity, wherein the control unit is configured to:

receive, from the hydrogen leakage detection unit, one of a discontinuation signal and a downtime schedule to enable repair of the section of the hydrogen amenity, wherein the discontinuation signal is to immediately discontinue supply of hydrogen to the section of the hydrogen amenity, the downtime schedule indicating a scheduled downtime for scheduling downtime of the hydrogen amenity;

in response to receiving the discontinuation signal, operate the one or more valves to immediately discontinue supply of hydrogen to the section of the hydrogen amenity; and in response to receiving the downtime schedule, operate the one or more valves according to the downtime schedule to discontinue supply of hydrogen to the section of the hydrogen amenity during the downtime.

6. The system of claim 1, wherein the system comprises:

the one or more sensor units, each of the one or more sensor units configured to:

sense, for a section of the hydrogen amenity, at least one of the concentration level of the hydrogen, the concentration level of the metal particles in the hydrogen, the temperature value of the hydrogen, the pressure value of the hydrogen, the humidity value, the deviation level of the electrochemical liquid, and the image of the section of the hydrogen amenity; and generate the sensor data for the section of the hydrogen amenity.

7. The system of claim 1, wherein the processing engine is configured to:

analyze the sensor data with a pre-trained leakage detection model to ascertain the occurrence of the hydrogen leakage event, wherein the pre-trained leakage detection model is developed based on statistical analysis of historical variations in the sensor data associated to the hydrogen leakage event; and determine the corresponding section of the hydrogen amenity for installing each sensor unit of the one or more sensor units based on at least one of an aperture of the sensor unit, a material of the hydrogen amenity, and a material of the sensor unit.

8. A method comprising:

receiving, by a hydrogen leakage detection unit, sensor data associated with a section of a hydrogen amenity, from a sensor unit installed proximate to the section of the hydrogen amenity, the hydrogen amenity being one of a hydrogen storage facility and a hydrogen transportation line, wherein the sensor data includes at least one of a concentration level of hydrogen within the section of the hydrogen amenity, a concentration level of metal particles in the hydrogen, a temperature value of the hydrogen, a pressure value of the hydrogen, a humidity value around the section, a deviation level of an electrochemical liquid within the sensor unit, and an image of the section of the hydrogen amenity;

processing, by the hydrogen leakage detection unit, the sensor data to determine a probable occurrence of hydrogen leakage at the section of the hydrogen amenity;

determining, by the hydrogen leakage detection unit, an estimated leakage time for the probable occurrence of hydrogen leakage, based on the sensor data;

utilizing a pre-trained leakage time estimation model, wherein the pre-trained leakage time estimation model is developed based on statistical analysis of historical variations in the sensor data associated to the probable occurrence of hydrogen leakage;

scheduling, by the hydrogen leakage detection unit, a downtime for the hydrogen amenity based on the estimated leakage time to enable repair of the section of the hydrogen amenity; and transmitting, by the hydrogen leakage detection unit, an alert notification to at least one of a user device and a control unit to take a preventive action for preventing the hydrogen leakage within the hydrogen amenity, the alert notification including:

identification data for at least one of the hydrogen amenity and the section of the hydrogen amenity;

at least one of an indication of the probable occurrence of hydrogen leakage and the estimated leakage time; and a downtime schedule indicating the scheduled downtime for the hydrogen amenity.

9. The method of claim 8, wherein the method further comprises:

analyzing the sensor data with a pre-trained leakage detection model to ascertain the occurrence of the hydrogen leakage event, wherein the pre-trained leakage detection model is developed based on statistical analysis of historical variations in the sensor data associated to the hydrogen leakage event; and scheduling, by the hydrogen leakage detection unit, a downtime for the hydrogen amenity based on the estimated leakage time to enable repair of the section of the hydrogen amenity;

generating, by the hydrogen leakage detection unit, a downtime schedule indicating the scheduled downtime; and transmitting, by the hydrogen leakage detection unit, the downtime schedule to the control unit associated with the hydrogen amenity to stop supply of hydrogen to the section of the hydrogen amenity during the downtime, wherein the control unit is configured to control supply of hydrogen to the hydrogen amenity.

10. The method of claim 8, wherein the method further comprises:

determining the section of the hydrogen amenity for installing the sensor unit based on at least one of an aperture of the sensor unit, a material of the hydrogen amenity, and a material of the sensor unit.

11. A non-transitory computer-readable medium comprising instructions for detecting hydrogen leakage in a hydrogen amenity, the instructions being executable by a processing resource to:

receive sensor data associated with a section of a hydrogen amenity, from a sensor unit installed proximate to the section of the hydrogen amenity, the hydrogen amenity being one of a hydrogen storage facility and a hydrogen transportation line, wherein the sensor data includes at least one of a concentration level of hydrogen within the section of the hydrogen amenity, a concentration level of metal particles in the hydrogen, a temperature value of the hydrogen, a pressure value of the hydrogen, a humidity value around the section, a deviation level of an electrochemical liquid within the sensor unit, and an image of the section of the hydrogen amenity;

process the sensor data to determine an occurrence of hydrogen leakage at the section of the hydrogen amenity;

determine a hydrogen leakage amount based on the sensor data;

determine an estimated leakage time for the occurrence of hydrogen leakage based on the sensor data utilizing a pre-trained leakage time estimation model, wherein the pre-trained leakage time estimation model is developed based on statistical analysis of historical variations in the sensor data associated to the occurrence of hydrogen leakage;

schedule a downtime for the hydrogen amenity based on the estimated leakage time to enable repair of the section of the hydrogen amenity; and transmit an alert notification to at least one of a user device and a control unit to take one or more preventive measures for preventing the hydrogen leakage within the hydrogen amenity, the alert notification including:

identification data for at least one of the hydrogen amenity and the section of the hydrogen amenity; and at least one of an indication of the occurrence of hydrogen leakage, the hydrogen leakage amount, and a site visit recommendation, generated based on the hydrogen leakage amount, for a user of the user device.

12. The non-transitory computer-readable medium of claim 11, wherein the instructions are executable by the processing resource to:

analyze the sensor data with a pre-trained leakage detection model to determine the occurrence of hydrogen leakage, wherein the pre-trained leakage detection model is developed based on statistical analysis of historical variations in the sensor data associated to the occurrence of hydrogen leakage;

generate a discontinuation signal to initiate discontinuation of supply of hydrogen to the section of the hydrogen amenity; and transmit the discontinuation signal to the control unit configured to control supply of hydrogen to the hydrogen amenity.

13. The non-transitory computer-readable medium of claim 11, wherein the instructions are executable by the processing resource to:

generate the site visit recommendation based on a comparison of the hydrogen leakage amount and a safe hydrogen level threshold; and select a service technician, from a plurality of service technicians, based on at least one of a service rating of the corresponding service technician and a distance of the corresponding service technician from the section of the hydrogen amenity, wherein the alert notification is transmitted to the user device associated to the selected service technician.

* * * * *